(12) United States Patent
Jeong et al.

(10) Patent No.: US 10,809,491 B2
(45) Date of Patent: Oct. 20, 2020

(54) PORTABLE ELECTRONIC DEVICE, OPTICAL IMAGING SYSTEM, AND LENS ASSEMBLY

(71) Applicant: Samsung Electro-Mechanics Co., Ltd., Suwon-si (KR)

(72) Inventors: Dae Hyun Jeong, Suwon-si (KR); Ho Sik Yoo, Suwon-si (KR); Jong In Lee, Suwon-si (KR); Jong Ki Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/449,616

(22) Filed: Jun. 24, 2019

(65) Prior Publication Data

US 2020/0064594 A1 Feb. 27, 2020

(30) Foreign Application Priority Data

Aug. 22, 2018 (KR) .................. 10-2018-0098221
Sep. 14, 2018 (KR) .................. 10-2018-0110439
Mar. 6, 2019 (KR) .................. 10-2019-0025946

(51) Int. Cl.
*G02B 9/62* (2006.01)
*G02B 9/64* (2006.01)
(Continued)

(52) U.S. Cl.
CPC .............. *G02B 9/64* (2013.01); *G02B 7/021* (2013.01); *H04N 5/2253* (2013.01); *H04N 5/2254* (2013.01)

(58) Field of Classification Search
CPC ...... G02B 9/64; G02B 7/021; G02B 13/0045; G02B 13/0065; G02B 9/60; G02B 9/62
See application file for complete search history.

(56) References Cited

U.S. PATENT DOCUMENTS

2004/0169939 A1 9/2004 Sawagami et al.
2013/0287383 A1 10/2013 Haruguchi et al.
(Continued)

FOREIGN PATENT DOCUMENTS

JP 4321078 B2 8/2009
JP 2013-228610 A 11/2013
(Continued)

OTHER PUBLICATIONS

Taiwanese Notice of Allowance dated Dec. 13, 2019 in counterpart Taiwanese Patent Application No. 108122868 (1 page in English and 3 pages in Chinese).
(Continued)

Primary Examiner — Joseph P Martinez
(74) Attorney, Agent, or Firm — NSIP Law

(57) ABSTRACT

An optical imaging system includes a first lens, a second lens, a third lens, a fourth lens, and a fifth lens, sequentially disposed from an object side, wherein the first to fifth lenses are spaced apart from each other by predetermined distances along an optical axis in a paraxial region, the first lens and the second lens each have a non-circular shape when viewed in an optical axis direction, and the optical imaging system satisfies 0.62398<ZS1/ZS2<1.36318, where ZS1 is a ratio of an area of an object-side surface of the first lens to a distance from the object-side surface of the first lens to an imaging plane of an image sensor, and ZS2 is a ratio of an area of an object-side surface of the second lens to a distance from the object-side surface of the second lens to the imaging plane of the image sensor.

20 Claims, 21 Drawing Sheets

(51) Int. Cl.
　　　*H04N 5/225*　　　(2006.01)
　　　*G02B 7/02*　　　(2006.01)

(56) References Cited

U.S. PATENT DOCUMENTS

| | | |
|---|---|---|
| 2015/0253647 A1 | 9/2015 | Mercado |
| 2017/0276913 A1* | 9/2017 | Yao .................... G02B 27/0025 |
| 2018/0039047 A1 | 2/2018 | Lin et al. |
| 2018/0081149 A1 | 3/2018 | Bae et al. |

FOREIGN PATENT DOCUMENTS

| | | |
|---|---|---|
| KR | 10-2006-0102466 A | 9/2006 |
| KR | 10-2018-0032058 A | 3/2018 |

OTHER PUBLICATIONS

Korean Office Action dated Jul. 9, 2020 in counterpart Korean Patent Application No. 10-2019-0025946 (7 pages in English and 5 pages in Korean).

* cited by examiner

PORTABLE ELECTRONIC DEVICE, OPTICAL IMAGING SYSTEM, AND LENS ASSEMBLY

CROSS-REFERENCE TO RELATED APPLICATIONS

This application claims benefit under 35 U.S.C. 119(a) of Korean Patent Application No. 10-2018-0098221 filed on Aug. 22, 2018, Korean Patent Application No. 10-2018-0110439 filed on Sep. 14, 2018, and Korean Patent Application No. 10-2019-0025946 filed on Mar. 6, 2019, in the Korean Intellectual Property Office, the entire disclosures of which are incorporated herein by reference for all purposes.

BACKGROUND

1. Field

This disclosure relates to a portable electronic device, an optical imaging system, and a lens assembly.

2. Description of the Background

A camera module may be used in portable electronic devices such as smartphones. Recently, miniaturization of a camera module mounted on the portable electronic devices has been demanded due to demand for miniaturization of the portable electronic devices.

However, when a size of a camera module is simply reduced, there may be a problem that performance of the camera modules may deteriorate. Therefore, research for reducing the size of the camera module may be required while maintaining or improving the performance of the camera module.

In general, since a lens of the camera module is substantially circular, and an image sensor of the camera module is rectangular, not all light refracted by the lens may be captured on the image sensor.

Accordingly, a method of reducing the size of the camera module by removing unnecessary portions from the lens to reduce the size of the lens may be considered.

However, when only a portion of the lens is simply removed, optical performance of the lens may be deteriorated to lower quality of the captured image.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, and a fifth lens, sequentially disposed from an object, wherein the first to fifth lenses are spaced apart from each other by predetermined distances along an optical axis in a paraxial region, the first lens and the second lens each have a non-circular shape when viewed in an optical axis direction, and the optical imaging system satisfies $0.62398 < ZS1/ZS2 < 1.36318$, where $ZS1$ is a ratio of an area of an object-side surface of the first lens to a distance on the optical axis from the object-side surface of the first lens to an imaging plane of an image sensor, and $ZS2$ is a ratio of an area of an object-side surface of the second lens to a distance on the optical axis from the object-side surface of the second lens to the imaging plane of the image sensor.

The optical imaging system may further satisfy $1.607 \text{ mm} < ZS1 < 2.014 \text{ mm}$.

The optical imaging system may further satisfy $1.838 \text{ mm} < ZS2 < 2.303 \text{ mm}$.

The first lens may include a first side surface and a second side surface, each having an arc shape when viewed in the optical axis direction, and a third side surface and a fourth side surface connecting the first side surface and the second side surface, and the optical imaging system may further satisfy $73.9 \text{ degrees} < \alpha < 106.4 \text{ degrees}$, where $\alpha$ is an angle between a first imaginary line connecting the optical axis and a connection point between the first side surface and the fourth side surface and a second imaginary line connecting the optical axis and a connection point between the second side surface and the fourth side surface.

The optical imaging system may further satisfy $0.599 < AR < 0.799$, where a line segment connecting the third side surface and the fourth side surface through the optical axis in a shortest distance represents a minor axis, a line segment connecting the first side surface and the second side surface through the optical axis and perpendicular to the minor axis represents a major axis, and AR is a ratio of a length of the minor axis to a length of the major axis.

The third to fifth lenses may each include a non-circular shape when viewed in the optical axis direction, and the optical imaging system may further satisfy $92.4 \text{ degrees} < \alpha < 121.0 \text{ degrees}$.

The optical imaging system may further satisfy $1.351 \text{ mm} < ZS1 < 1.811 \text{ mm}$ and $1.545 \text{ mm} < ZS2 < 2.07 \text{ mm}$.

The optical imaging system may further include a sixth lens and a seventh lens. The third to seventh lenses may each have a non-circular shape when viewed in the optical axis direction. The optical imaging system may further satisfy $79.4 \text{ degrees} < \alpha < 126.4 \text{ degrees}$, The optical imaging system may further satisfy $1.106 \text{ mm} < ZS1 < 1.828 \text{ mm}$ and $1.194 \text{ mm} < ZS2 < 1.975 \text{ mm}$.

The optical imaging system may further satisfy $86.2 \text{ degrees} < \alpha < 116.0 \text{ degrees}$.

The optical imaging system may further satisfy $1.1 \text{ mm} < ZS1 < 1.438 \text{ mm}$ and $1.258 \text{ mm} < ZS2 < 1.644 \text{ mm}$.

A length of a relative long side of the image sensor may be 1.5 times or more a length of a relative short side of the image sensor. The optical imaging system may further satisfy $101.3 \text{ degrees} < \alpha < 128.6 \text{ degrees}$.

The optical imaging system may further satisfy $0.916 \text{ mm} < ZS1 < 1.284 \text{ mm}$ and $1.048 \text{ mm} < ZS2 < 1.468 \text{ mm}$.

The optical imaging system may further satisfy $109.2 \text{ degrees} < \alpha < 135.4 \text{ degrees}$.

The optical imaging system may further satisfy $0.920 \text{ mm} < ZS1 < 1.355 \text{ mm}$ and $0.994 \text{ mm} < ZS2 < 1.464 \text{ mm}$.

The optical imaging system may be a portable electronic device, further including a display. The image sensor may be configured to convert light incident through the first through fifth lenses to an electric signal and the display may be configured to display an image based on the electric signal.

In another general aspect, a lens assembly includes a first lens, a second lens, a third lens, a fourth lens, a fifth lens, and an image sensor, sequentially disposed from an object side, wherein the first to fifth lenses are spaced apart from each other by predetermined distances along an optical axis in a paraxial region, the first lens and the second lens each have a non-circular shape when viewed in an optical axis direction, the first lens and the second lens each include an optical portion for refracting light and a flange portion extending along a periphery of at least a portion of the optical portion, and the optical imaging system satisfies 0.73598<ZS'1/ZS'2<1.37987, where ZS'1 is a ratio of an area of the optical portion on an object-side surface of the first lens to a distance on the optical axis from the object-side surface of the first lens to an imaging plane of the image sensor, and ZS'2 is a ratio of an area of the optical portion on an object-side surface of the second lens to a distance on the optical axis from the object-side surface of the second lens to the imaging plane of the image sensor.

In another general aspect, a portable electronic device includes a first lens, a second lens, a third lens, a fourth lens, a fifth lens, and an image sensor configured to convert light incident through the first through fifth lenses to an electric signal, sequentially disposed along an optical axis from an object side, a reflection member disposed in front of the first to fifth lenses and configured to change a traveling direction of light from a thickness direction of the portable electronic device to an optical axis direction, and a display unit configured to display an image based on the electric signal, wherein the first lens and the second lens each have a non-circular shape when viewed in the optical axis direction, the first lens and the second lens each include an optical portion for refracting light and a flange portion extending along a periphery of a portion of the optical portion, and wherein the flange portion is disposed on opposite sides of the optical portion spaced apart in a direction perpendicular to the thickness direction of the portable electronic device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
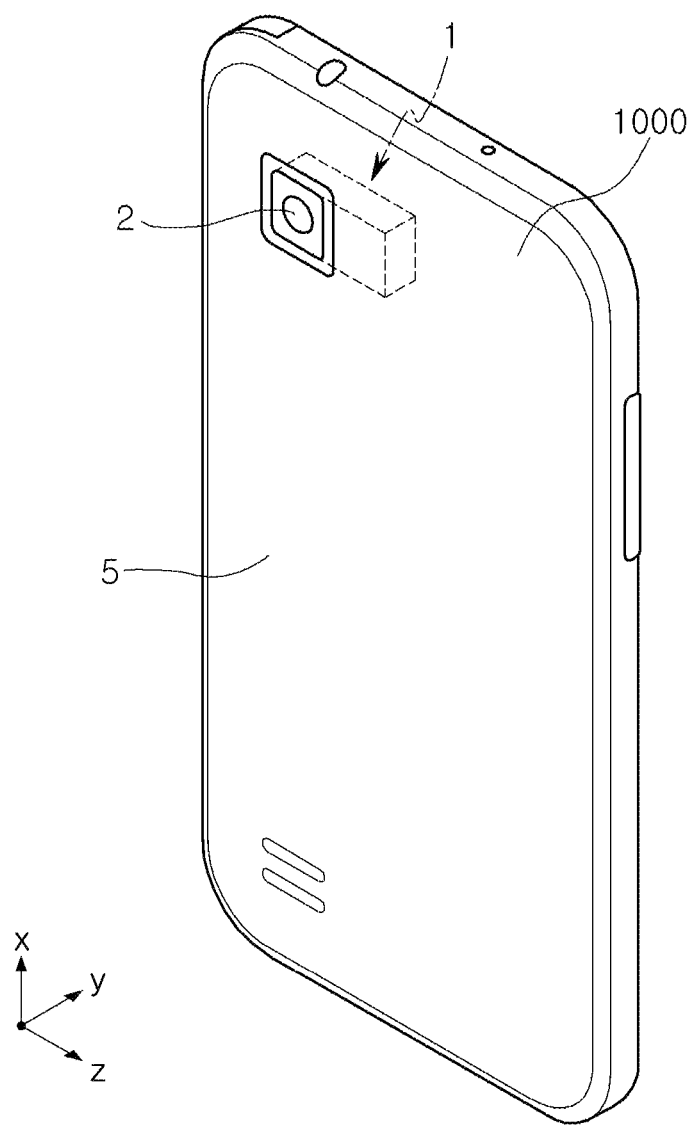
FIG. 1 is a perspective view of a portable electronic device according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Also, when one element is "electrically connected to" another element, they may be physically connected to each other, or they may be not in physical contact with each other.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

One or more examples of a portable electronic device, an optical imaging system, and a lens assembly that may have reduced size and improved performance are described herein.

FIG. 1 is a perspective view of a portable electronic device according to an embodiment of the present disclosure.

Referring to FIG. 1, a portable electronic device 1000 according to an exemplary embodiment of the present disclosure may be a portable electronic device, such as a mobile communications terminal, a smartphone, or a tablet PC, including a camera module 1.

Figure 2:
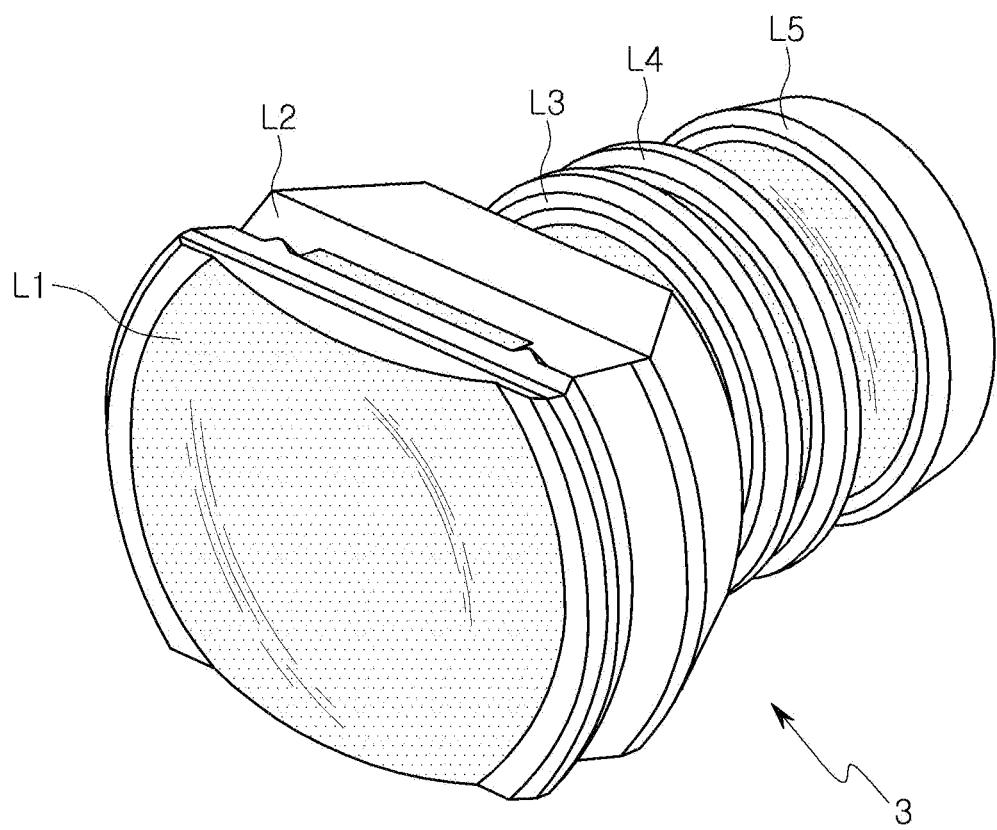
FIG. 2 is a schematic perspective view of an optical imaging system according to an embodiment of the present disclosure.
Figure 3:
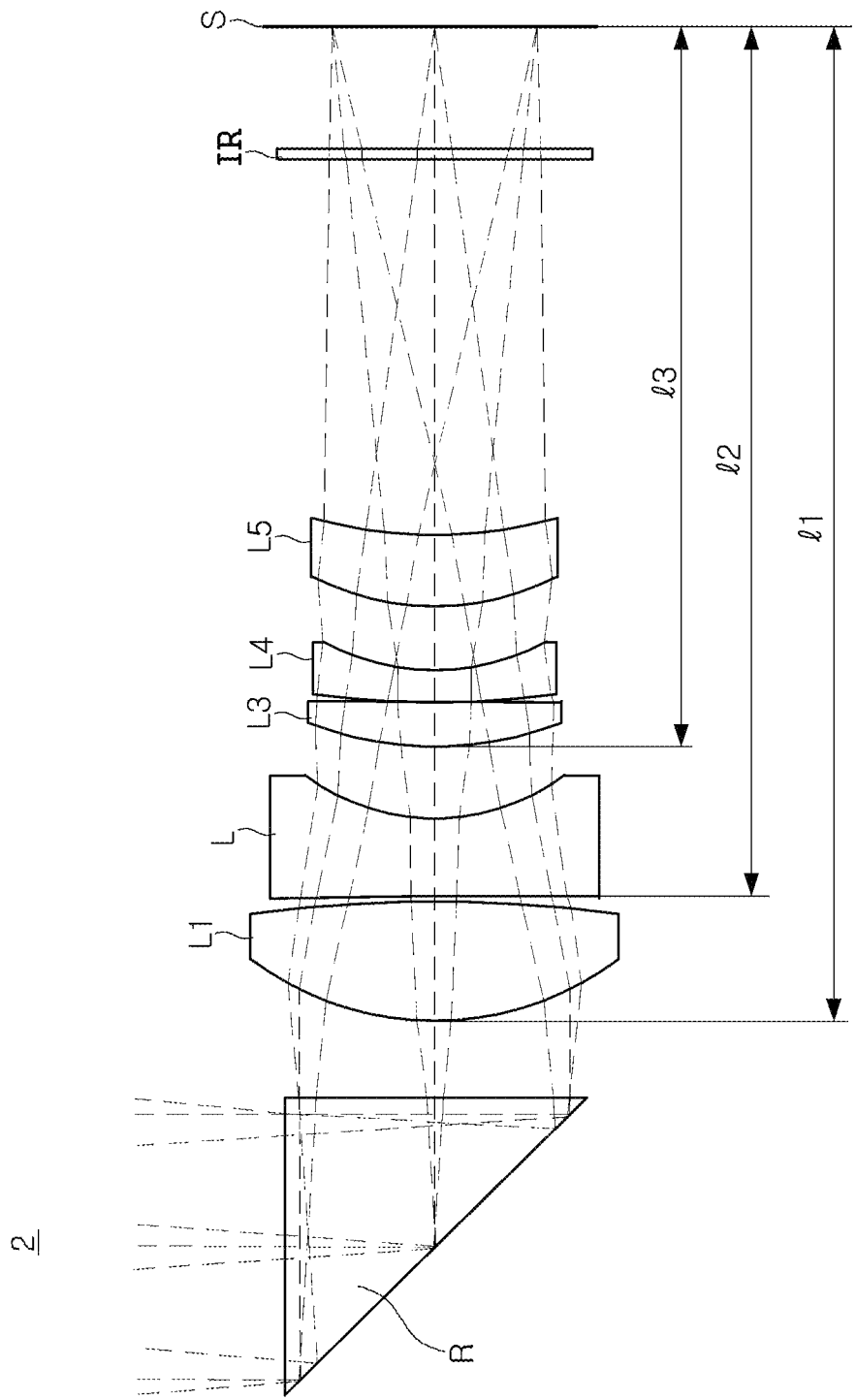
FIG. 3 is a schematic cross-sectional view of a lens assembly according to an embodiment of the present disclosure.

As illustrated in FIGS. 1, 2, and 3, the camera module 1 may be mounted on the portable electronic device 1000 to photograph a subject. The camera module 1 may include a lens assembly 2.

The lens assembly 2 may include an optical imaging system 3 and an image sensor S, and may further include a reflection member R (see FIG. 3). The optical imaging system 3 may include a plurality of lenses.

In an embodiment of the present disclosure, the camera module 1 may be configured such that an optical axis (a z axis) of the plurality of lenses may be disposed in a direction, perpendicular to a thickness direction of the portable electronic device 1000 (a Y axis direction, i.e., a direction from a front surface of the portable electronic device 1000 to a rear surface thereof, or in an opposite direction).

For example, the optical axis (Z-axis) of the plurality of lenses provided in the camera module 1 may be formed in a width direction or a longitudinal direction of the portable electronic device 1000.

Therefore, even when the camera module 1 has functions such as Auto Focusing (hereinafter, referring to as "AF"), Optical Zoom (hereinafter, referring to as "Zoom"), and Optical Image Stabilization (hereinafter, referring to as "OIS"), it may be prevented from a further increase in a thickness of the portable electronic device 1000. Therefore, the portable electronic device 1000 may be miniaturized.

The camera module 1 according to an embodiment of the present disclosure may include at least one of the AF, Zoom, and OIS functions.

In the case of the camera module 1 having the AF, Zoom, and OIS functions, a size of the camera module 1 may be increased compared to a size of a conventional camera module.

As the size of the camera module 1 increases, the size of the portable electronic device 1000 on which the camera module 1 is mounted may be also affected. Therefore, there is a limitation to the miniaturization of the portable electronic device 1000.

For example, the camera module needs to change a focal length of the optical imaging system 3 in order to realize the Zoom function. In this case, space may be required to move at least a portion of the plurality of lenses.

When the optical axis (the z axis) of the plurality of lenses is formed in the thickness direction (the Y axis direction) of the portable electronic device 1000, a thickness of the portable electronic device 1000 may also increase. In a case in which the thickness of the portable electronic device 1000 does not increase, space for moving the lenses may be not sufficient. Therefore, it may be difficult to implement the Zoom function.

In order to realize the AF and OIS functions, an actuator for moving the optical imaging system 3 in the optical axis direction, and in a direction, perpendicular to the optical axis, should be provided. When the optical axis (the z axis) is provided in the thickness direction (the Y axis direction) of the portable electronic device 1000, the thickness of the portable electronic device 1000 may increase due to the actuator for moving the optical imaging system 3.

Since the camera module 1 according to an embodiment of the present disclosure may be arranged such that the optical axis (the z axis) of the plurality of lenses is disposed perpendicular to the thickness direction (the Y axis direction) of the portable electronic device 1000, the thickness of the portable electronic device 1000 may be prevented from being increased, even when the camera module 1 having the OIS function is mounted on the portable electronic device 1000. Therefore, the portable electronic device 1000 may be miniaturized.

FIG. 2 is a schematic perspective view of an optical imaging system according to an embodiment of the present disclosure, and FIG. 3 is a schematic cross-sectional view of a lens assembly according to an embodiment of the present disclosure.

Referring to FIGS. 2 and 3, a lens assembly 2 according to an embodiment of the present disclosure may include an optical imaging system 3 including a plurality of lenses L1, L2, L3, L4, and L5, an infrared light blocking filter IR, and an image sensor S, and may further include a reflection member R.

The reflection member R may be disposed in front of the plurality of lenses L1, L2, L3, L4, and L5, and may be configured to change a traveling direction of light. Therefore, a path of light incident on the camera module 1 may be changed by the reflection member R.

For example, the light incident on the camera module 1 may be changed in the traveling direction by the reflection member R to face the plurality of lenses L1, L2, L3, L4, and L5.

The reflection member R may be a mirror or a prism that reflects light.

The infrared light blocking filter IR may function to block light in an infrared light region of light incident through the plurality of lenses L1, L2, L3, L4, and L5.

The image sensor S may convert light incident through the plurality of lenses L1, L2, L3, L4, and L5 into electric signals. For example, the image sensor S may be an electric charge coupled device (CCD) or a complementary metal-oxide semiconductor (CMOS).

The portable electronic device 1000 may include a display unit 5 disposed on a surface of the portable electronic apparatus 1000 to display an image based on the electric signals of the image sensor S. For example, the display unit 5 may include a liquid crystal display (LCD), a light-emitting diode (LED), an organic light-emitting diode (OLED), etc., or combinations thereof.

The plurality of lenses L1, L2, L3, L4, and L5 may include a first lens L1, a second lens L2, a third lens L3, a fourth lens L4, and a fifth lens L5, sequentially disposed in numerical order in a direction from an object side of the optical imaging system to an image side thereof. Six or more of lenses may be included when necessary.

The plurality of lenses L1, L2, L3, L4, and L5 may be spaced apart from neighboring lenses by a predetermined distance.

At least a portion of the plurality of lenses L1, L2, L3, L4, and L5 may have a non-circular planar shape. For example, the first lens L1 and the second lens L2 may be formed in a non-circular shape, and the third lens L3 to the fifth lens L5 may be formed in a circular shape (see FIG. 2).

Here, the term "circular shape" refers to not only a complete circle, but also a partly cut shape in which a gate portion of a plastic injection lens is cut off.

Therefore, the third lens L3 to the fifth lens L5 may be a partly cut shape in which a portion of a circle is cut off by cutting the gate portion, which may be a moving passage of a resin material, for example, an injection portion for injection molding formation of the lens.

Here, the term "non-circular shape" refers that the lens may be not circular in a region other than the gate portion of the plastic injection lens.

The first lens L1 may have four side surfaces, and two side surfaces among them may be formed to face each other. Further, the side surfaces facing each other may have shapes corresponding to each other.

For example, when viewed in the optical axis direction, the first side surface and the second side surface of the first lens L1 may have an arc shape, and the third side surface and the fourth side surface may have a substantially straight shape. The gate portion, which may be a moving passage of the resin material, may be formed on either the first side surface or the second side surface.

A shape of the second lens L2 may be substantially similar to a shape of the first lens L1, and the first lens L1 will be described below for convenience of explanation.

All of the plurality of lenses L1, L2, L3, L4, and L5 may have a non-circular planar shape.

Figure 4:
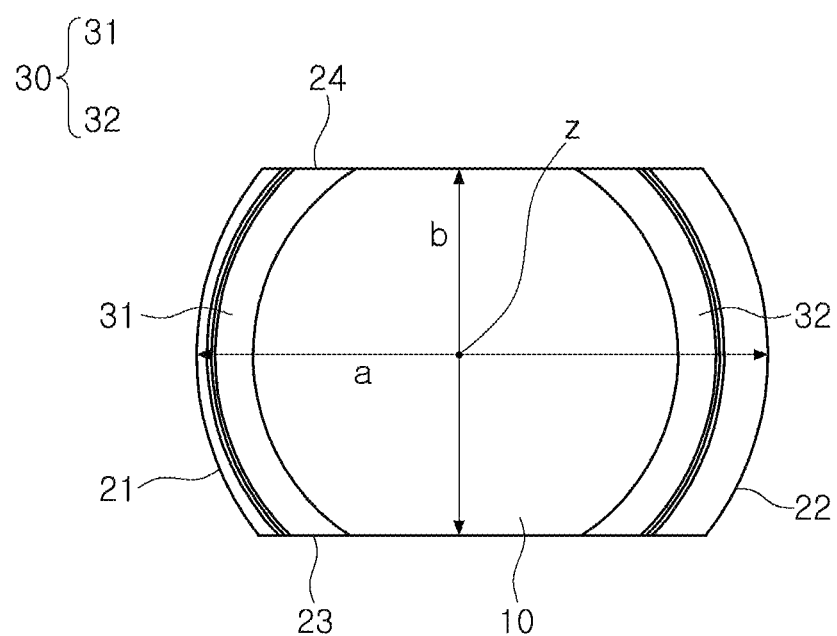
FIGS. 4 and 5 are plan views of a first lens of an optical imaging system according to an embodiment of the present disclosure.
Figure 5:
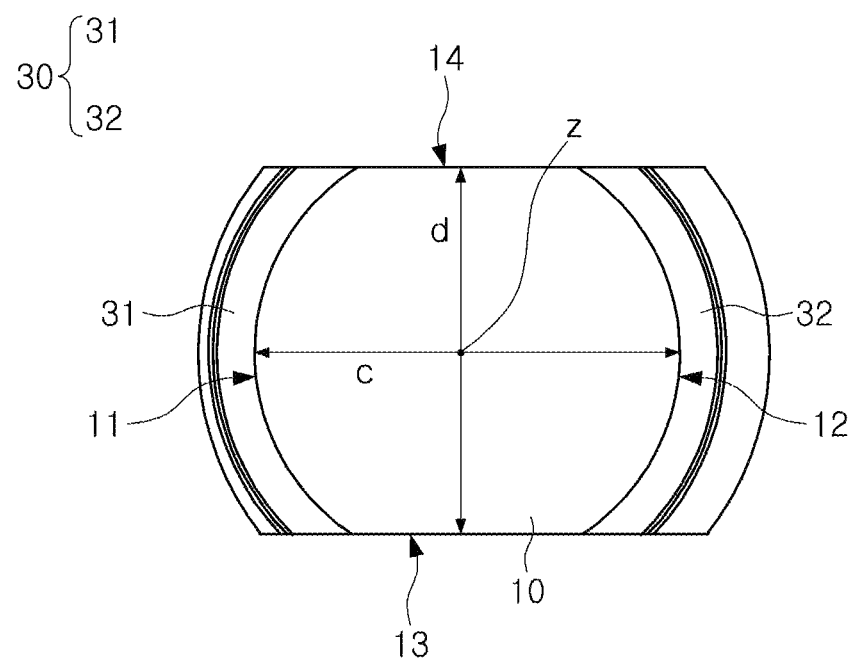

FIGS. 4 and 5 are plan views of a first lens of an optical imaging system according to an embodiment of the present disclosure.

Referring to FIG. 4, a first lens L1 may have four side surfaces, and two side surfaces among them may be formed to face each other. Further, the side surfaces facing each other may have shapes corresponding to each other.

For example, when viewed in the optical axis direction, a first side surface 21 and a second side surface 22 of the first lens L1 may have an arc shape, and a third side surface 23 and a fourth side surface 24 may have a substantially straight shape.

The third side surface 23 and the fourth side surface 24 may connect the first side surface 21 and the second side surface 22, respectively.

The third side surface 23 and the fourth side surface 24 may be symmetrical about the optical axis, and may be formed to be parallel to each other.

The first lens L1 may have a major axis (a) and a minor axis (b). For example, as illustrated in FIG. 4, when viewed in the optical axis direction, a line segment connecting the third side surface 23 and the fourth side surface 24 through the optical axis (the z axis) in a shortest distance represents a minor axis (b), and a line segment connecting the first side surface 21 and the second side surface 22 through the optical axis (the z axis) and perpendicular to the minor axis (b) represents a major axis (a).

The first lens L1 may include an optical portion 10 and a flange portion 30.

The optical portion 10 may be a portion in which optical performance of the first lens L1 is exerted. For example, light reflected from a subject may be refracted while passing through the optical portion 10.

The optical portion 10 may have positive or negative refractive power, and may have a spherical or non-spherical shape.

The flange portion 30 may be a portion for fixing the first lens L1 to another component, for example, a lens barrel or the second lens L2.

The flange portion 30 may extend around at least a portion of the optical portion 10, and may be formed integrally with the optical portion 10.

The optical portion 10 and the flange portion 30 may be formed in a non-circular shape. For example, the optical portion 10 and the flange portion 30 may be non-circular when viewed in the optical axis direction (see FIG. 4). Alternatively, the optical portion 10 may have a circular shape, and the flange portion 30 may have a non-circular shape.

Referring to FIG. 5, an optical portion 10 may include a first edge 11, a second edge 12, a third edge 13, and a fourth edge 14. The first edge 11 and the second edge 12 may be located opposite to each other, and the third edge 13 and the fourth edge 14 may be located opposite to each other.

The third edge 13 and the fourth edge 14 may connect the first edge 11 and the second edge 12, respectively.

When viewed in the optical axis direction, the first edge 11 and the second edge 12 may have an arc shape, and the third edge 13 and the fourth edge 14 may have a substantially straight shape.

The third edge 13 and the fourth edge 14 may be symmetrical about the optical axis (the z axis), and may be formed to be parallel to each other.

The optical portion 10 may have a major axis (c) and a minor axis (d). For example, when viewed in the optical axis direction, a line segment connecting the third edge 13 and the fourth edge 14 through the optical axis (the z axis) in a shortest distance represents a minor axis (d), and a line segment connecting the first edge 11 and the second edge 12 through the optical axis (the z axis) and perpendicular to the minor axis (d) represents a major axis (c).

A flange portion 30 may include a first flange portion 31 and a second flange portion 32. The first flange portion 31 may extend from the first edge 11 of the optical portion 10, and the second flange portion 32 may extend from the second edge 12 of the optical portion 10.

The first edge 11 of the optical portion 10 may refer to a portion adjacent to the first flange portion 31, and the second edge 12 of the optical portion 10 may refer to a portion adjacent to the second flange portion 32.

The third edge 13 of the optical portion 10 may refer to a side surface of the optical portion 10 in which the flange portion 30 is not formed, and the fourth edge 14 of the optical portion 10 may refer to the other side surface of the optical portion 10 in which the flange portion 30 is not formed.

The first lens L1 may be made of a plastic material, and may be injection-molded through a mold. Here, the third edge 13 and the fourth edge 14 of the first lens L1 according to an embodiment of the present disclosure may be formed to have the above-described shape during an injection molding operation, but may not be formed by cutting a portion of the lens after the injection molding operation.

When a portion of the lens is removed after the injection molding operation, the lens may be deformed by force applied to the lens in the course of the injection molding operation. When the lens is deformed, optical performance of the lens may inevitably be changed.

Since the first lens L1 according to an embodiment of the present disclosure is formed in a non-circular shape when the first lens L1 is injected, a size of the first lens L1 may be reduced, and performance of the first lens L1 may be ensured.

Figure 6:
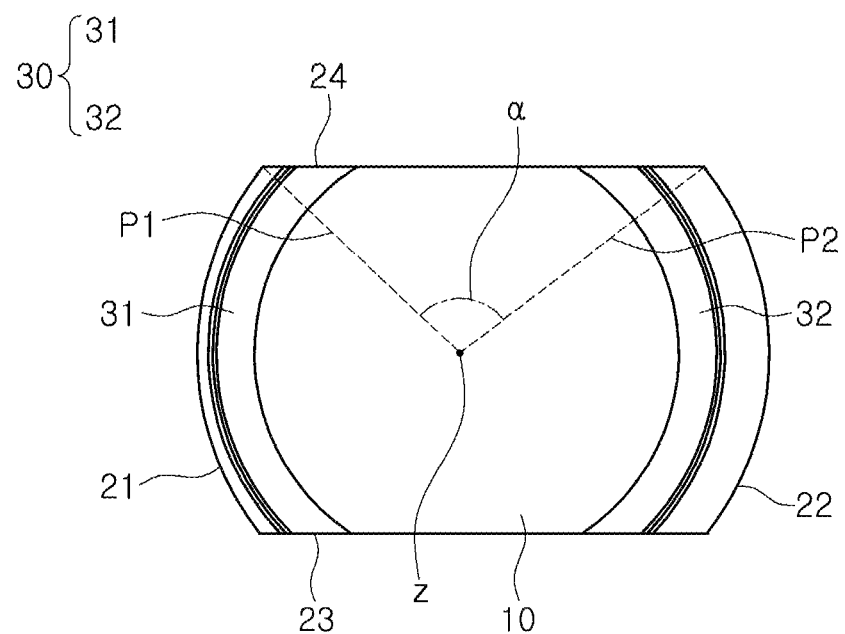
FIGS. 6 and 7 are plan views illustrating a non-circular lens of a lens assembly according to an embodiment of the present disclosure.
Figure 7:
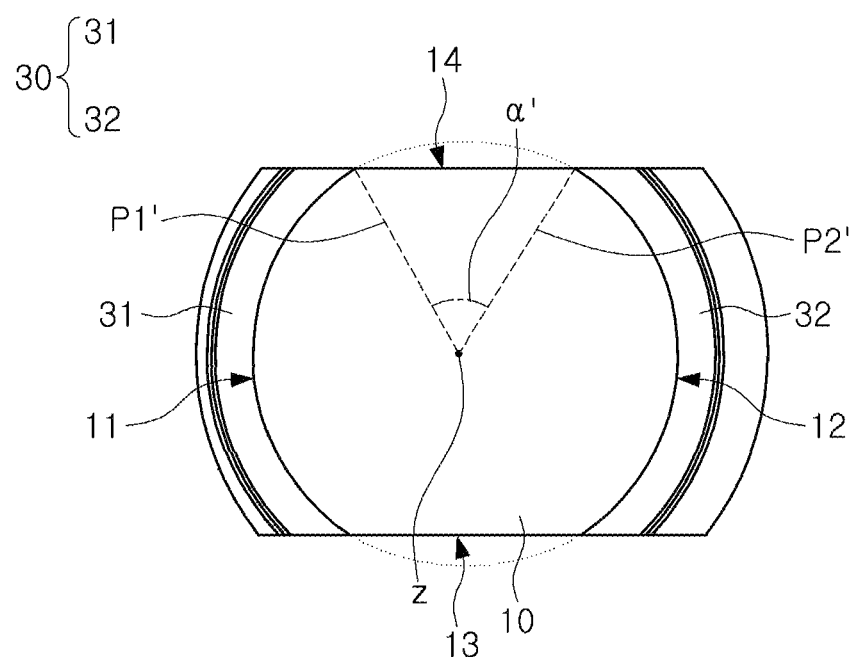

FIGS. 6 and 7 are plan views illustrating a non-circular lens of a lens assembly according to an embodiment of the present disclosure.

Referring to FIG. 6, in an embodiment of the present disclosure, at least a portion of a lens of a lens assembly 2 may be formed in a non-circular shape. For example, the non-circular lens may have a first side surface 21, a second side surface 22, a third side surface 23, and a fourth side surface 24. When viewed in the optical axis direction, the first side surface 21 and the second side surface 22 may have an arc shape, and the third side surface 23 and the fourth side surface 24 may have a substantially straight shape.

The gate portion, which may be a moving passage of a resin material, may be formed on either the first side surface 21 or the second side surface 22, but is not illustrated in FIG. 6.

Referring to FIG. 6, a dashed line refers to a first imaginary line (P1) connecting an optical axis (a z axis) and a connection point between a first side surface 21 and a fourth side surface 24 (or a third side surface 23) of a non-circular lens, and a second imaginary line (P2) connecting an optical axis (a z axis) and a connection point between a second side surface 22 and a fourth side surface 24 (or a third side surface 23) of a non-circular lens. A dashed-dotted line refers to an angle ($\alpha$) between the two imaginary lines.

In an embodiment of the present disclosure, ZS is defined as a ratio of an area of an object-side surface of a non-circular lens to the total length.

$$ZSn = \frac{An}{\ln}, (n = 1, 2, 3, 4, 5, 6, 7, \ldots)$$

A refers to an area of an object-side surface of a non-circular lens. The area of the object-side surface refers to the sum of areas of an optical portion 10 and a flange portion 30.

n refers to a constant for designating a specific lens. For example, A1 refers to an area of an object-side surface of a first lens L1, and A2 refers to an area of an object-side surface of a second lens L2.

I refers to the total track length. The total track length refers to a distance of an optical axis from an object-side surface of a non-circular lens to an imaging plane of an image sensor S. For example, l1 refers to a distance of an optical axis from an object-side surface of a first lens L1 to an imaging plane of an image sensor S, l2 refers to a distance of an optical axis from an object-side surface of a second lens L2 to an imaging plane of an image sensor S, and l3 refers to a distance of an optical axis from an object-side surface of a third lens L3 to an imaging plane of an image sensor S (see FIG. 3).

$\alpha$ refers to an angle between a first imaginary line (P1) connecting an optical axis (a z axis) and a connection point between a first side surface 21 and a fourth side surface 24 and a second imaginary line (P2) connecting an optical axis (a z axis) and a connection point between a second side surface 22 and a fourth side surface 24. For example, $\alpha 1$ refers to an angle between the first imaginary line (P1) and the second imaginary line (P2) of the first lens L1, and $\alpha 2$ refers to an angle between the first imaginary line (P1) and the second imaginary line (P2) of the second lens L2.

Referring to FIG. 7, in an embodiment of the present disclosure, an optical portion 10 may be formed in a non-circular shape. For example, the optical portion 10 may include a first edge 11, a second edge 12, a third edge 13, and a fourth edge 14. When viewed in the optical axis direction, the first edge 11 and the second edge 12 may have an arc shape, and the third edge 13 and the fourth edge 14 may have a substantially straight shape.

Referring to FIG. 7, a dotted line refers to an area through which light actually passes. A dashed line refers to a first imaginary line (P1') connecting an optical axis (a z axis) and a connection point between a first edge 11 and a fourth edge 14 (or a third edge 13) of an optical portion 10, and a second imaginary line (P2') connecting an optical axis (a z axis) and a connection point between a second edge 12 and a fourth edge 14 (or a third edge 13) of an optical portion 10. A dashed-dotted line refers to an angle ($\alpha'$) between the two imaginary lines.

In an embodiment of the present disclosure, ZS' is defined as a ratio of an area of an optical portion 10 to the total length.

$$ZS'n = \frac{A'n}{\ln}, (n = 1, 2, 3, 4, 5, 6, 7, \ldots)$$

A' refers to an area of an optical portion 10 in an object-side surface of a non-circular lens.

n refers to a constant for designating a specific lens. For example, A'1 refers to an area of an optical portion 10 in an object-side surface of a first lens L1, and A'2 refers to an area of an optical portion 10 in an object-side surface of a second lens L2.

l refers to the total track length. The total track length refers to a distance of an optical axis from an object-side surface of a non-circular lens to an imaging plane of an image sensor S. For example, l1 refers to a distance of an optical axis from an object-side surface of a first lens L1 to an imaging plane of an image sensor S, l2 refers to a distance of an optical axis from an object-side surface of a second lens L2 to an imaging plane of an image sensor S, and l3 refers to a distance of an optical axis from an object-side surface of a third lens L3 to an imaging plane of an image sensor S (see FIG. 3).

α' refers to an angle between a first imaginary line (P1') connecting an optical axis (a z axis) and a connection point between a first edge 11 and a fourth edge 14 and a second imaginary line (P2') connecting an optical axis (a z axis) and a connection point between a second edge 12 and a fourth edge 14. For example, α'1 refers to an angle between the first imaginary line (P1') and the second imaginary line (P2') of the first lens L1, and α'2 refers to an angle between the first imaginary line and the second imaginary line of the second lens L2.

As a first embodiment of a lens assembly 2, a case in which a first lens L1 and a second lens L2 among a plurality of lenses are non-circular and the other lenses are circular will be described. A plurality of lenses includes a first lens L1 to a fifth lens L5. In the first embodiment of the lens assembly 2, the lens assembly 2 has a fixed focal length. Also, the lens assembly 2 has an F-number (hereinafter, referred to as "FNO") of 2.8. FNO refers to a constant indicating brightness of a lens assembly 2.

The first lens L1 satisfies the following Conditional Expression 1-1, and the second lens L2 satisfies the following Conditional Expression 1-2.

$1.607 \text{ mm} < ZS1 < 2.014 \text{ mm}$ [Conditional Expression 1-1]

$1.838 \text{ mm} < ZS2 < 2.303 \text{ mm}$ [Conditional Expression 1-2]

In Conditional Expression 1-1, ZS1 refers to a ratio (A1/l1) of an area (A1) of an object-side surface of the first lens L1 to a distance (l1) of the optical axis from the object-side surface of the first lens L1 to an imaging plane of an image sensor S. The area (A1) of the object-side surface of the first lens L1 refers to the total area of the object-side surface of the first lens L1 (the sum of an area of an optical portion and an area of a flange portion).

In Conditional Expression 1-2, ZS2 refers to a ratio (A2/l2) of an area (A2) of an object-side surface of the second lens L2 to a distance (l2) of the optical axis from the object-side surface of the second lens L2 to an imaging plane of an image sensor S. The area (A2) of the object-side surface of the second lens L2 refers to the total area of the object-side surface of the second lens L2 (the sum of an area of an optical portion and an area of a flange portion).

In the first embodiment, the first lens L1 and the second lens L2 satisfy at least one of the following Conditional Expressions 1-3 and 1-4.

$73.9 \text{ degrees} < \alpha < 106.4 \text{ degrees}$ [Conditional Expression 1-3]

$0.599 < AR < 0.799$ [Conditional Expression 1-4]

In Conditional Expression 1-3, α refers to an angle between the first imaginary line (P1) and the second imaginary line (P2) of the first lens L1.

In Conditional Expression 1-4, AR refers to an aspect ratio of the object-side surface of the first lens L1. AR refers to a ratio (b/a) of a length of the minor axis (b) of the first lens L1 to a length of the major axis (a) of the first lens L1.

An angle between the first imaginary line and the second imaginary line of the second lens L2, and an aspect ratio of the object-side surface of the second lens L2 refer to the same characteristics as previously described with regard to the first lens L1.

The first lens L1 satisfies at least one of the following Conditional Expressions 1-5 to 1-7.

$1.218 \text{ mm} < ZS'1 < 1.477 \text{ mm}$ [Conditional Expression 1-5]

$61.6 \text{ degrees} < \alpha'1 < 97.5 \text{ degrees}$ [Conditional Expression 1-6]

$0.659 < AR'1 < 0.859$ [Conditional Expression 1-7]

In Conditional Expression 1-5, ZS'1 refers to a ratio (A'1/l1) of an area (A'1) of an object-side surface of the first lens L1 to a distance (l1) of the optical axis from the object-side surface of the first lens L1 to an imaging plane of an image sensor S. The area (A'1) of the object-side surface of the first lens L1 refers to an area of the optical portion 10 in the object-side surface of the first lens L1.

In Conditional Expression 1-6, α'1 refers to an angle between a first imaginary line (P1') connecting an optical axis and a connection point between a first edge 11 and a fourth edge 14 of the optical portion 10 of the first lens L1 and a second imaginary line (P2') connecting an optical axis and a connection point between a second edge 12 and a fourth edge 14 of the optical portion 10 of the first lens L1.

In Conditional Expression 1-7, AR'1 refers to an aspect ratio of the optical portion 10 in the object-side surface of the first lens L1. AR'1 refers to a ratio (d/c) of a length of the minor axis (d) of the optical portion 10 of the first lens L1 to a length of the major axis (c) of the optical portion 10 of the first lens L1.

The second lens L2 satisfies at least one of the following Conditional Expressions 1-8 to 1-10.

$1.221 \text{ mm} < ZS'2 < 1.404 \text{ mm}$ [Conditional Expression 1-8]

$34.7 \text{ degrees} < \alpha'2 < 82.0 \text{ degrees}$ [Conditional Expression 1-9]

$0.755 < AR'2 < 0.955$ [Conditional Expression 1-10]

In Conditional Expression 1-8, ZS'2 refers to a ratio (A'2/l2) of an area (A'2) of an object-side surface of the second lens L2 to a distance (l2) of the optical axis from the object-side surface of the second lens L2 to an imaging plane of an image sensor S. The area (A'2) of the object-side surface of the second lens L2 refers to an area of the optical portion in the object-side surface of the second lens L2.

In Conditional Expression 1-9, α'2 refers to an angle between a first imaginary line connecting an optical axis and a connection point between a first edge 11 and a fourth edge 14 of the optical portion of the second lens L2 and a second imaginary line connecting an optical axis and a connection point between a second edge 12 and a fourth edge 14 of the optical portion of the second lens L2.

In Conditional Expression 1-10, AR'2 refers to an aspect ratio of the optical portion in the object-side surface of the second lens L2. AR'2 refers to a ratio of a length of the minor axis of the optical portion of the second lens L2 to a length of the major axis of the optical portion of the second lens L2.

The following Table 1 illustrates an embodiment of a lens assembly 2 satisfying the above Conditional Expressions 1-1 to 1-10. In the following Tables 1 to 6, a unit of the total length is mm.

TABLE 1

| Lens | Total Track Length (l) | Object-Side Surface | | | | Optical Portion of Object-Side Surface | | | |
|---|---|---|---|---|---|---|---|---|---|
| | | AR | α | A | ZS | AR' | α' | A' | ZS' |
| L1 | 14.98 | 0.699 | 91.268 | 27.333 | 1.825 | 0.759 | 81.226 | 20.362 | 1.359 |
| L2 | 13.1 | 0.699 | 91.268 | 27.333 | 2.087 | 0.855 | 62.578 | 17.400 | 1.328 |

The first lens L1 and the second lens L2 are configured to be aligned with respect to each other. For example, the first lens L1 and the second lens L2 are coupled to each other to align their optical axes.

A flange portion of an image-side surface of the first lens L1 and a flange portion of an object-side surface of the second lens L2 have a concavo-convex structure, respectively, and the concavo-convex structure of the first lens L1 and the concavo-convex structure of the second lens L2 are configured to be coupled to each other such that the optical axis is aligned.

As a second embodiment of a lens assembly 2, a case in which all of a plurality of lenses are non-circular will be described. The plurality of lenses include a first lens L1 to a fifth lens L5. In the second embodiment of the lens assembly 2, the lens assembly 2 has a fixed focal length. Also, the lens assembly 2 has an FNO of 2.8. FNO refers to a constant indicating brightness of a lens assembly 2.

The first lens L1 satisfies the following Conditional Expression 2-1, the second lens L2 satisfies the following Conditional Expression 2-2, the third lens L3 satisfies the following Conditional Expression 2-3, the fourth lens L4 satisfies the following Conditional Expression 2-4, and the fifth lens L5 satisfies the following Conditional Expression 2-5.

$1.351 \text{ mm} < ZS1 < 1.811 \text{ mm}$ [Conditional Expression 2-1]

$1.545 \text{ mm} < ZS2 < 2.070 \text{ mm}$ [Conditional Expression 2-2]

$1.869 \text{ mm} < ZS3 < 2.504 \text{ mm}$ [Conditional Expression 2-3]

$1.994 \text{ mm} < ZS4 < 2.672 \text{ mm}$ [Conditional Expression 2-4]

$2.318 \text{ mm} < ZS5 < 3.107 \text{ mm}$ [Conditional Expression 2-5]

In Conditional Expression 2-1, ZS1 refers to a ratio (A1/l1) of an area (A1) of an object-side surface of the first lens L1 to a distance (l1) of the optical axis from the object-side surface of the first lens L1 to an imaging plane of an image sensor S. The area (A1) of the object-side surface of the first lens L1 refers to the total area of the object-side surface of the first lens L1 (the sum of an area of an optical portion and an area of a flange portion).

In Conditional Expression 2-2, ZS2 refers to a ratio (A2/l2) of an area (A2) of an object-side surface of the second lens L2 to a distance (l2) of the optical axis from the object-side surface of the second lens L2 to an imaging plane of an image sensor S. The area (A2) of the object-side surface of the second lens L2 refers to the total area of the object-side surface of the second lens L2 (the sum of an area of an optical portion and an area of a flange portion).

In Conditional Expression 2-3, ZS3 refers to a ratio (A3/l3) of an area (A3) of an object-side surface of the third lens L3 to a distance (l3) of the optical axis from the object-side surface of the third lens L3 to an imaging plane of an image sensor S. The area (A3) of the object-side surface of the third lens L3 refers to the total area of the object-side surface of the third lens L3 (the sum of an area of an optical portion and an area of a flange portion).

In Conditional Expression 2-4, ZS4 refers to a ratio (A4/l4) of an area (A4) of an object-side surface of the fourth lens L4 to a distance (l4) of the optical axis from the object-side surface of the fourth lens L4 to an imaging plane of an image sensor S. The area (A4) of the object-side surface of the fourth lens L4 refers to the total area of the object-side surface of the fourth lens L4 (the sum of an area of an optical portion and an area of a flange portion).

In Conditional Expression 2-5, ZS5 refers to a ratio (A5/l5) of an area (A5) of an object-side surface of the fifth lens L5 to a distance (l5) of the optical axis from the object-side surface of the fifth lens L5 to an imaging plane of an image sensor S. The area (A5) of the object-side surface of the fifth lens L5 refers to the total area of the object-side surface of the fifth lens L5 (the sum of an area of an optical portion and an area of a flange portion).

In the second embodiment, the first lens L1 to the fifth lens L5 satisfy at least one of the following Conditional Expressions 2-6 and 2-7.

$92.4 \text{ degrees} < \alpha < 121.0 \text{ degrees}$ [Conditional Expression 2-6]

$0.492 < AR < 0.692$ [Conditional Expression 2-7]

In Conditional Expression 2-6, a refers to an angle between the first imaginary line (P1) and the second imaginary line (P2) of the first lens L1.

In Conditional Expression 2-7, AR refers to an aspect ratio of the object-side surface of the first lens L1. AR refers to a ratio of a length of the minor axis (b) of the first lens L1 to a length of the major axis (a) of the first lens L1.

An angle between the first imaginary line and the second imaginary line of the second lens L2 to the fifth lens L5, and an aspect ratio of the object-side surface of the second lens L2 to the fifth lens L5 refer to the same characteristics as previously described with regard to the first lens L1

The first lens L1 satisfies at least one of the following Conditional Expressions 2-8 to 2-10.

$1.013 \text{ mm} < ZS'1 < 1.322 \text{ mm}$ [Conditional Expression 2-8]

$86.0 \text{ degrees} < \alpha'1 < 115.8 \text{ degrees}$ [Conditional Expression 2-9]

$0.531 < AR'1 < 0.731$ [Conditional Expression 2-10]

In Conditional Expression 2-8, ZS'1 refers to a ratio (A1/l1) of an area (A'1) of an object-side surface of the first lens L1 to a distance (l1) of the optical axis from the object-side surface of the first lens L1 to an imaging plane of an image sensor S. The area (A'1) of the object-side surface of the first lens L1 refers to an area of the optical portion 10 in the object-side surface of the first lens L1.

In Conditional Expression 2-9, α'1 refers to an angle between a first imaginary line (P1') connecting an optical axis and a connection point between a first edge 11 and a fourth edge 14 of the optical portion 10 of the first lens L1 and a second imaginary line (P2') connecting an optical axis and a connection point between a second edge 12 and a fourth edge 14 of the optical portion 10 of the first lens L1.

In Conditional Expression 2-10, AR'1 refers to an aspect ratio of the optical portion 10 in the object-side surface of the first lens L1. AR'1 refers to a ratio of a length of the minor axis (d) of the optical portion 10 of the first lens L1 to a length of the major axis (c) of the optical portion 10 of the first lens L1.

The second lens L2 satisfies at least one of the following Conditional Expressions 2-11 to 2-13.

| 1.032 mm<ZS'2<1.284 mm | [Conditional Expression 2-11] |
| 71.7 degrees<α'2<104.7 degrees | [Conditional Expression 2-12] |
| 0.611<AR'2<0.811 | [Conditional Expression 2-13] |

In Conditional Expression 2-11, ZS'2 refers to a ratio (A'2/l2) of an area (A'2) of an object-side surface of the second lens L2 to a distance (l2) of the optical axis from the object-side surface of the second lens L2 to an imaging plane of an image sensor S. The area (A'2) of the object-side surface of the second lens L2 refers to an area of the optical portion in the object-side surface of the second lens L2.

In Conditional Expression 2-12, α'2 refers to an angle between a first imaginary line connecting an optical axis and a connection point between a first edge and a fourth edge of the optical portion of the second lens L2 and a second imaginary line connecting an optical axis and a connection point between a second edge and a fourth edge of the optical portion of the second lens L2.

In Conditional Expression 2-13, AR'2 refers to an aspect ratio of the optical portion in the object-side surface of the second lens L2. AR'2 refers to a ratio of a length of the minor axis of the optical portion of the second lens L2 to a length of the major axis of the optical portion of the second lens L2.

The third lens L3 satisfies at least one of the following Conditional Expressions 2-14 to 2-16.

| 0.926 mm<ZS'3<1.011 mm | [Conditional Expression 2-14] |
| 0 degree<α'3<68.5 degrees | [Conditional Expression 2-15] |
| 0.827<AR'3<1.000 | [Conditional Expression 2-16] |

In Conditional Expression 2-14, ZS'3 refers to a ratio (A'3/l3) of an area (A'3) of an object-side surface of the third lens L3 to a distance (l3) of the optical axis from the object-side surface of the third lens L3 to an imaging plane of an image sensor S. The area (A'3) of the object-side surface of the third lens L3 refers to an area of an optical portion in the object-side surface of the third lens L3.

In Conditional Expression 2-15, α'3 refers to an angle between a first imaginary line connecting an optical axis and a connection point between a first edge and a fourth edge of the optical portion of the third lens L3 and a second imaginary line connecting an optical axis and a connection point between a second edge and a fourth edge of the optical portion of the third lens L3.

In Conditional Expression 2-16, AR'3 refers to an aspect ratio of the optical portion in the object-side surface of the third lens L3. AR'3 refers to a ratio of a length of the minor axis of the optical portion of the third lens L3 to a length of the major axis of the optical portion of the third lens L3.

The fourth lens L4 satisfies at least one of the following Conditional Expressions 2-17 to 2-19.

| 0.950 mm<ZS'4<1.016 mm | [Conditional Expression 2-17] |
| 0 degree<α'4<62.5 degrees | [Conditional Expression 2-18] |
| 0.855<AR'4<1.000 | [Conditional Expression 2-19] |

In Conditional Expression 2-17, ZS'4 refers to a ratio (A'4/l4) of an area (A'4) of an object-side surface of the fourth lens L4 to a distance (l4) of the optical axis from the object-side surface of the fourth lens L4 to an imaging plane of an image sensor S. The area (A'4) of the object-side surface of the fourth lens L4 refers to an area of an optical portion in the object-side surface of the fourth lens L4.

In Conditional Expression 2-18, α'4 refers to an angle between a first imaginary line connecting an optical axis and a connection point between a first edge and a fourth edge of the optical portion of the fourth lens L4 and a second imaginary line connecting an optical axis and a connection point between a second edge and a fourth edge of the optical portion of the fourth lens L4.

In Conditional Expression 2-19, AR'4 refers to an aspect ratio of the optical portion in the object-side surface of the fourth lens L4. AR'4 refers to a ratio of a length of the minor axis of the optical portion of the fourth lens L4 to a length of the major axis of the optical portion of the fourth lens L4.

The fifth lens L5 satisfies at least one of the following Conditional Expressions 2-20 to 2-22.

| 1.095 mm<ZS'5<1.166 mm | [Conditional Expression 2-20] |
| 0 degree<α'5<61.1 degrees | [Conditional Expression 2-21] |
| 0.861<AR'5<1.000 | [Conditional Expression 2-22] |

In Conditional Expression 2-20, ZS'S refers to a ratio (A'5/l5) of an area (A'5) of an object-side surface of the fifth lens L5 to a distance (l5) of the optical axis from the object-side surface of the fifth lens L5 to an imaging plane of an image sensor S. The area (A'5) of the object-side surface of the fifth lens L5 refers to an area of an optical portion in the object-side surface of the fifth lens L5.

In Conditional Expression 2-21, α'5 refers to an angle between a first imaginary line connecting an optical axis and a connection point between a first edge and a fourth edge of the optical portion of the fifth lens L5 and a second imaginary line connecting an optical axis and a connection point between a second edge and a fourth edge of the optical portion of the fifth lens L5.

In Conditional Expression 2-22, AR'5 refers to an aspect ratio of the optical portion in the object-side surface of the fifth lens L5. AR'5 refers to a ratio of a length of the minor axis of the optical portion of the fifth lens L5 to a length of the major axis of the optical portion of the fifth lens L5.

The following Table 2 illustrates an embodiment of a lens assembly 2 satisfying the above Conditional Expressions 2-1 to 2-22.

TABLE 2

| | Total Track | Object-Side Surface | | | | Optical Portion of Object-Side Surface | | | |
|---|---|---|---|---|---|---|---|---|---|
| Lens | Length (l) | AR | α | A | ZS | AR' | α' | A' | ZS' |
| L1 | 14.98 | 0.592 | 107.350 | 23.838 | 1.591 | 0.631 | 101.695 | 17.612 | 1.176 |
| L2 | 13.1 | 0.592 | 107.350 | 23.838 | 1.820 | 0.711 | 89.406 | 15.291 | 1.167 |
| L3 | 10.83 | 0.592 | 107.350 | 23.838 | 2.201 | 0.927 | 44.172 | 10.692 | 0.987 |
| L4 | 10.15 | 0.592 | 107.350 | 23.838 | 2.349 | 0.955 | 34.606 | 10.197 | 1.005 |
| L5 | 8.73 | 0.592 | 107.350 | 23.838 | 2.731 | 0.961 | 32.063 | 10.086 | 1.155 |

The first lens L1 and the second lens L2 are configured to be aligned with respect to each other. For example, the first lens L1 and the second lens L2 are coupled to each other to align their optical axes.

A flange portion of an image-side surface of the first lens L1 and a flange portion of an object-side surface of the second lens L2 have a concavo-convex structure, respectively, and the concavo-convex structure of the first lens L1 and the concavo-convex structure of the second lens L2 are configured to be coupled to each other such that the optical axis is aligned.

As a third embodiment of a lens assembly 2, a case in which all of a plurality of lenses are non-circular will be described. The plurality of lenses include a first lens L1 to a seventh lens L7. In the third embodiment of the lens assembly 2, the lens assembly 2 has a variable focal length. In this case, the lens assembly 2 of the third embodiment may change a focal length of the lens assembly 2 by moving at least a portion of the lenses to change a distance between the lenses.

Also, the lens assembly 2 has an FNO between 3.0 and 4.0. FNO refers to a constant indicating brightness of a lens assembly 2.

The first lens L1 satisfies the following Conditional Expression 3-1, the second lens L2 satisfies the following Conditional Expression 3-2, the third lens L3 satisfies the following Conditional Expression 3-3, the fourth lens L4 satisfies the following Conditional Expression 3-4, the fifth lens L5 satisfies the following Conditional Expression 3-5, the sixth lens L6 satisfies the following Conditional Expression 3-6, and the seventh lens L7 satisfies the following Conditional Expression 3-7.

1.106 mm<ZS1<1.828 mm  [Conditional Expression 3-1]

1.194 mm<ZS2<1.975 mm  [Conditional Expression 3-2]

1.385 mm<ZS3<2.289 mm  [Conditional Expression 3-3]

1.559 mm<ZS4<2.576 mm  [Conditional Expression 3-4]

1.765 mm<ZS5<2.919 mm  [Conditional Expression 3-5]

2.754 mm<ZS6<4.552 mm  [Conditional Expression 3-6]

3.361 mm<ZS7<5.556 mm  [Conditional Expression 3-7]

In Conditional Expression 3-1, ZS1 refers to a ratio (A1/l1) of an area (A1) of an object-side surface of the first lens L1 to a distance (l1) of the optical axis from the object-side surface of the first lens L1 to an imaging plane of an image sensor S. The area (A1) of the object-side surface of the first lens L1 refers to the total area of the object-side surface of the first lens L1 (the sum of an area of an optical portion and an area of a flange portion).

In Conditional Expression 3-2, ZS2 refers to a ratio (A2/L2) of an area (A2) of an object-side surface of the second lens L2 to a distance (l2) of the optical axis from the object-side surface of the second lens L2 to an imaging plane of an image sensor S. The area (A2) of the object-side surface of the second lens L2 refers to the total area of the object-side surface of the second lens L2 (the sum of an area of an optical portion and an area of a flange portion).

In Conditional Expression 3-3, ZS3 refers to a ratio (A3/l3) of an area (A3) of an object-side surface of the third lens L3 to a distance (l3) of the optical axis from the object-side surface of the third lens L3 to an imaging plane of an image sensor S. The area (A3) of the object-side surface of the third lens L3 refers to the total area of the object-side surface of the third lens L3 (the sum of an area of an optical portion and an area of a flange portion).

In Conditional Expression 3-4, ZS4 refers to a ratio (A4/l4) of an area (A4) of an object-side surface of the fourth lens L4 to a distance (l4) of the optical axis from the object-side surface of the fourth lens L4 to an imaging plane of an image sensor S. The area (A4) of the object-side surface of the fourth lens L4 refers to the total area of the object-side surface of the fourth lens L4 (the sum of an area of an optical portion and an area of a flange portion).

In Conditional Expression 3-5, ZS5 refers to a ratio (A5/l5) of an area (A5) of an object-side surface of the fifth lens L5 to a distance (l5) of the optical axis from the object-side surface of the fifth lens L5 to an imaging plane of an image sensor S. The area (A5) of the object-side surface of the fifth lens L5 refers to the total area of the object-side surface of the fifth lens L5 (the sum of an area of an optical portion and an area of a flange portion).

In Conditional Expression 3-6, ZS6 refers to a ratio (A6/l6) of an area (A6) of an object-side surface of the sixth lens L6 to a distance (l6) of the optical axis from the object-side surface of the sixth lens L6 to an imaging plane of an image sensor S. The area (A6) of the object-side surface of the sixth lens L6 refers to the total area of the object-side surface of the sixth lens L6 (the sum of an area of an optical portion and an area of a flange portion).

In Conditional Expression 3-7, ZS7 refers to a ratio (A7/l7) of an area (A7) of an object-side surface of the seventh lens L7 to a distance (l7) of the optical axis from the object-side surface of the seventh lens L7 to an imaging plane of an image sensor S. The area (A7) of the object-side surface of the seventh lens L7 refers to the total area of the object-side surface of the seventh lens L7 (the sum of an area of an optical portion and an area of a flange portion).

In the third embodiment, the first lens L1 to the seventh lens L7 satisfy at least one of the following Conditional Expressions 3-8 and 3-9.

79.4 degrees<α<126.4 degrees  [Conditional Expression 3-8]

0.451<AR<0.769  [Conditional Expression 3-9]

In Conditional Expression 3-8, a refers to an angle between the first imaginary line (P1) and the second imaginary line (P2) of the first lens L1.

In Conditional Expression 3-9, AR refers to an aspect ratio of the object-side surface of the first lens L1. AR refers to a ratio of a length of the minor axis (b) of the first lens L1 to a length of the major axis (a) of the first lens L1.

An angle between the first imaginary line and the second imaginary line of the second lens L2 to the seventh lens L7, and an aspect ratio of the object-side surface of the second lens L2 to the seventh lens L7 refer to the same characteristics as previously described with regard to the first lens L1.

The first lens L1 satisfies at least one of the following Conditional Expressions 3-10 to 3-12.

| 0.616 mm<ZS'1<1.066 mm | [Conditional Expression 3-10] |
| 0 degree<α'1<106.7 degrees | [Conditional Expression 3-11] |
| 0.597<AR'1<1.0 | [Conditional Expression 3-11] |

In Conditional Expression 3-10, ZS'1 refers to a ratio (A1/l1) of an area (A'1) of an object-side surface of the first lens L1 to a distance (l1) of the optical axis from the object-side surface of the first lens L1 to an imaging plane of an image sensor S. The area (A'1) of the object-side surface of the first lens L1 refers to an area of the optical portion 10 in the object-side surface of the first lens L1.

In Conditional Expression 3-11, α'1 refers to an angle between a first imaginary line (P1') connecting an optical axis and a connection point between a first edge 11 and a fourth edge 14 of the optical portion 10 of the first lens L1 and a second imaginary line (P2') connecting an optical axis and a connection point between a second edge 12 and a fourth edge 14 of the optical portion 10 of the first lens L1.

In Conditional Expression 3-12, AR'1 refers to an aspect ratio of the optical portion 10 in the object-side surface of the first lens L1. AR'1 refers to a ratio of a length of the minor axis (d) of the optical portion 10 of the first lens L1 to a length of the major axis (c) of the optical portion 10 of the first lens L1.

The second lens L2 satisfies at least one of the following Conditional Expressions 3-13 to 3-15.

| 0.616 mm<ZS'2<1.061 mm | [Conditional Expression 3-13] |
| 0 degree<α'2<100.7 degrees | [Conditional Expression 3-14] |
| 0.638<AR'2<1.0 | [Conditional Expression 3-15] |

In Conditional Expression 3-13, ZS'2 refers to a ratio (A'2/l2) of an area (A'2) of an object-side surface of the second lens L2 to a distance (l2) of the optical axis from the object-side surface of the second lens L2 to an imaging plane of an image sensor S. The area (A'2) of the object-side surface of the second lens L2 refers to an area of the optical portion in the object-side surface of the second lens L2.

In Conditional Expression 3-14, α'2 refers to an angle between a first imaginary line connecting an optical axis and a connection point between a first edge and a fourth edge of the optical portion of the second lens L2 and a second imaginary line connecting an optical axis and a connection point between a second edge and a fourth edge of the optical portion of the second lens L2.

In Conditional Expression 3-15, AR'2 refers to an aspect ratio of the optical portion in the object-side surface of the second lens L2. AR'2 refers to a ratio of a length of the minor axis of the optical portion of the second lens L2 to a length of the major axis of the optical portion of the second lens L2.

The third lens L3 satisfies at least one of the following Conditional Expressions 3-16 to 3-18.

| 0.796 mm<ZS'3<1.383 mm | [Conditional Expression 3-16] |
| 0 degree<α'3<109.3 degrees | [Conditional Expression 3-17] |
| 0.579<AR'3<1.000 | [Conditional Expression 3-18] |

In Conditional Expression 3-16, ZS'3 refers to a ratio (A'3/l3) of an area (A'3) of an object-side surface of the third lens L3 to a distance (l3) of the optical axis from the object-side surface of the third lens L3 to an imaging plane of an image sensor S. The area (A'3) of the object-side surface of the third lens L3 refers to an area of an optical portion in the object-side surface of the third lens L3.

In Conditional Expression 3-17, α'3 refers to an angle between a first imaginary line connecting an optical axis and a connection point between a first edge and a fourth edge of the optical portion of the third lens L3 and a second imaginary line connecting an optical axis and a connection point between a second edge and a fourth edge of the optical portion of the third lens L3.

In Conditional Expression 3-18, AR'3 refers to an aspect ratio of the optical portion in the object-side surface of the third lens L3. AR'3 refers to a ratio of a length of the minor axis of the optical portion of the third lens L3 to a length of the major axis of the optical portion of the third lens L3.

The fourth lens L4 satisfies at least one of the following Conditional Expressions 3-19 to 3-21.

| 0.782 mm<ZS'4<1.346 mm | [Conditional Expression 3-19] |
| 0 degree<α'4<98.6 degrees | [Conditional Expression 3-20] |
| 0.652<AR'4<1.000 | [Conditional Expression 3-21] |

In Conditional Expression 3-19, ZS'4 refers to a ratio (A'4/l4) of an area (A'4) of an object-side surface of the fourth lens L4 to a distance (l4) of the optical axis from the object-side surface of the fourth lens L4 to an imaging plane of an image sensor S. The area (A'4) of the object-side surface of the fourth lens L4 refers to an area of an optical portion in the object-side surface of the fourth lens L4.

In Conditional Expression 3-20, α'4 refers to an angle between a first imaginary line connecting an optical axis and a connection point between a first edge and a fourth edge of the optical portion of the fourth lens L4 and a second imaginary line connecting an optical axis and a connection point between a second edge and a fourth edge of the optical portion of the fourth lens L4.

In Conditional Expression 3-21, AR'4 refers to an aspect ratio of the optical portion in the object-side surface of the fourth lens L4. AR'4 refers to a ratio of a length of the minor axis of the optical portion of the fourth lens L4 to a length of the major axis of the optical portion of the fourth lens L4.

The fifth lens L5 satisfies at least one of the following Conditional Expressions 3-22 to 3-24.

| 0.844 mm<ZS'5<1.451 mm | [Conditional Expression 3-22] |
| 0 degree<α'5<94.7 degrees | [Conditional Expression 3-23] |
| 0.678<AR'5<1.000 | [Conditional Expression 3-24] |

In Conditional Expression 3-22, ZS'S refers to a ratio (A'5/l5) of an area (A'5) of an object-side surface of the fifth lens L5 to a distance (l5) of the optical axis from the object-side surface of the fifth lens L5 to an imaging plane of an image sensor S. The area (A'5) of the object-side surface of the fifth lens L5 refers to an area of an optical portion in the object-side surface of the fifth lens L5.

In Conditional Expression 3-23, α'5 refers to an angle between a first imaginary line connecting an optical axis and a connection point between a first edge and a fourth edge of the optical portion of the fifth lens L5 and a second imaginary line connecting an optical axis and a connection point between a second edge and a fourth edge of the optical portion of the fifth lens L5.

In Conditional Expression 3-24, AR'5 refers to an aspect ratio of the optical portion in the object-side surface of the fifth lens L5. AR'5 refers to a ratio of a length of the minor axis of the optical portion of the fifth lens L5 to a length of the major axis of the optical portion of the fifth lens L5.

The sixth lens L6 satisfies at least one of the following Conditional Expressions 3-25 to 3-27.

1.438 mm<ZS'6<2.477 mm  [Conditional Expression 3-25]

0 degree<α'6<101.7 degrees  [Conditional Expression 3-26]

0.631<AR'6<1.0  [Conditional Expression 3-27]

In Conditional Expression 3-25, ZS'6 refers to a ratio (A'6/l6) of an area (A'6) of an object-side surface of the sixth lens L6 to a distance (l6) of the optical axis from the object-side surface of the sixth lens L6 to an imaging plane of an image sensor S. The area (A'6) of the object-side surface of the sixth lens L6 refers to an area of an optical portion in the object-side surface of the sixth lens L6.

In Conditional Expression 3-26, α'6 refers to an angle between a first imaginary line connecting an optical axis and a connection point between a first edge and a fourth edge of the optical portion of the sixth lens L6 and a second imaginary line connecting an optical axis and a connection point between a second edge and a fourth edge of the optical portion of the sixth lens L6.

In Conditional Expression 3-27, AR'6 refers to an aspect ratio of the optical portion in the object-side surface of the sixth lens L6. AR'6 refers to a ratio of a length of the minor axis of the optical portion of the sixth lens L6 to a length of the major axis of the optical portion of the sixth lens L6.

The seventh lens L7 satisfies at least one of the following Conditional Expressions 3-28 to 3-30.

1.915 mm<ZS'7<3.323 mm  [Conditional Expression 3-28]

0 degree<α'7<108.5 degrees  [Conditional Expression 3-29]

0.584<AR'7<1.0  [Conditional Expression 3-30]

In Conditional Expression 3-28, ZS'7 refers to a ratio (A'7/l7) of an area (A'7) of an object-side surface of the seventh lens L7 to a distance (l7) of the optical axis from the object-side surface of the seventh lens L7 to an imaging plane of an image sensor S. The area (A'7) of the object-side surface of the seventh lens L7 refers to an area of an optical portion in the object-side surface of the seventh lens L7.

In Conditional Expression 3-29, α'7 refers to an angle between a first imaginary line connecting an optical axis and a connection point between a first edge and a fourth edge of the optical portion of the seventh lens L7 and a second imaginary line connecting an optical axis and a connection point between a second edge and a fourth edge of the optical portion of the seventh lens L7.

In Conditional Expression 3-30, AR'7 refers to an aspect ratio of the optical portion in the object-side surface of the seventh lens L7. AR'7 refers to a ratio of a length of the minor axis of the optical portion of the seventh lens L7 to a length of the major axis of the optical portion of the seventh lens L7.

The following Table 3 illustrates an embodiment of the lens assembly 2 satisfying the above Conditional Expressions 3-1 to 3-30. In an embodiment of the present disclosure, the lens assembly 2 has an FNO of 3.5.

TABLE 3

| Lens | Total Track Length (l) | Object-Side Surface | | | | Optical Portion of Object-Side Surface | | | |
|---|---|---|---|---|---|---|---|---|---|
| | | AR | α | A | ZS | AR' | α' | A' | ZS' |
| L1 | 16.9 | 0.613 | 104.375 | 23.750 | 1.405 | 0.813 | 71.253 | 13.414 | 0.794 |
| L2 | 15.65 | 0.613 | 104.375 | 23.750 | 1.518 | 0.861 | 61.153 | 12.399 | 0.792 |
| L3 | 13.5 | 0.613 | 104.375 | 23.750 | 1.759 | 0.792 | 75.257 | 13.882 | 1.028 |
| L4 | 11.994 | 0.613 | 104.375 | 23.750 | 1.980 | 0.877 | 57.319 | 12.068 | 1.006 |
| L5 | 10.588 | 0.613 | 104.375 | 23.750 | 2.243 | 0.907 | 49.750 | 11.493 | 1.085 |
| L6 | 6.788 | 0.613 | 104.375 | 23.750 | 3.499 | 0.853 | 62.877 | 12.557 | 1.850 |
| L7 | 5.562 | 0.613 | 104.375 | 23.750 | 4.270 | 0.798 | 74.136 | 13.747 | 2.472 |

In a fourth embodiment of a lens assembly 2, a first lens L1 to a third lens L3 among a plurality of lenses are non-circular, the other lenses are circular, and a length of a relative long side of the image sensor S is 1.5 times or more a length of a relative short side of the image sensor S. For example, a ratio of the length of the relative long side to the relative short side of the image sensor S is 16:9, 18:9, or 19:9.

The plurality of lenses include a first lens L1 to a fifth lens L5, and the lens assembly 2, in the fourth embodiment of the lens assembly 2, has a fixed focal length.

Further, the lens assembly 2 has an FNO of 4.0. FNO refers to a constant indicating brightness of a lens assembly 2.

Figure 8:
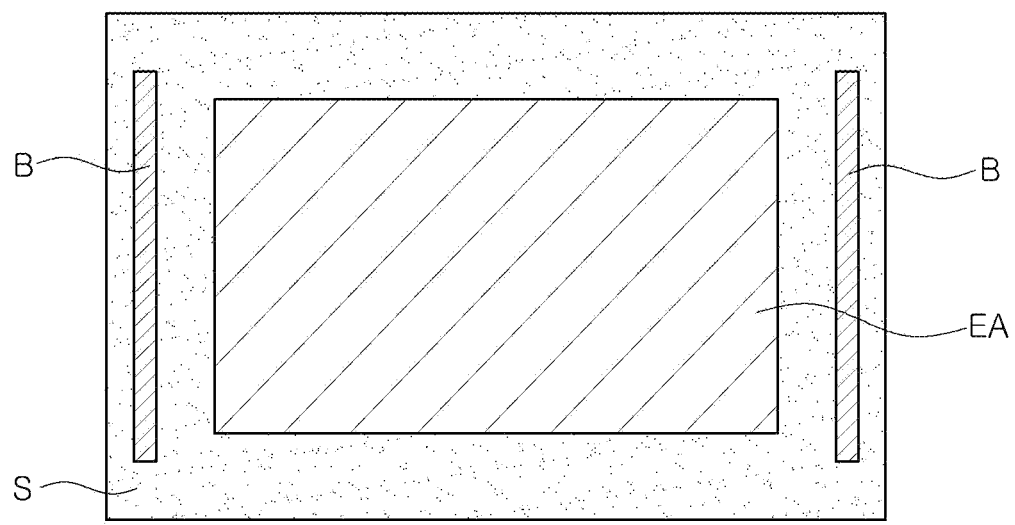
FIG. 8 is a schematic plan view of an image sensor according to an embodiment of the present disclosure.

Referring to FIG. 8, an image sensor S has a rectangular shape, and a length of a relative long side of the image sensor S, in the fourth to sixth embodiments of the lens assembly 2, is 1.5 times or more a length of a relative short side of the lens assembly 2.

The image sensor S includes an effective imaging area EA, and the number of pixels of the effective imaging area EA in a traverse direction (corresponding to the relative long side of the image sensor S) is 1.5 times or more the number of pixels in a longitudinal direction (corresponding to the relative short side of the image sensor S). For example, a ratio of the number of pixels of the effective imaging area EA in a traverse direction to the number of pixels of the effective imaging area EA in a longitudinal direction is 16:9, 18:9, or 19:9.

The image sensor S may be connected to a substrate by a wire bonding process. For this purpose, a bonding pad B may be provided in the image sensor S.

The bonding pad B may be formed at a position adjacent to both sides of the relative short side of the image sensor S.

The first lens L1 satisfies the following Conditional Expression 4-1, the second lens L2 satisfies the following Conditional Expression 4-2, and the third lens L3 satisfies the following Conditional Expression 4-3.

| 1.1 mm<ZS1<1.438 mm | [Conditional Expression 4-1] |
| 1.258 mm<ZS2<1.644 mm | [Conditional Expression 4-2] |
| 1.522 mm<ZS3<1.989 mm | [Conditional Expression 4-3] |

In Conditional Expression 4-1, ZS1 refers to a ratio (A1/l1) of an area (A1) of an object-side surface of the first lens L1 to a distance (l1) of the optical axis from the object-side surface of the first lens L1 to an imaging plane of an image sensor S. The area (A1) of the object-side surface of the first lens L1 refers to the total area of the object-side surface of the first lens L1 (the sum of an area of an optical portion and an area of a flange portion).

In Conditional Expression 4-2, ZS2 refers to a ratio (A2/l2) of an area (A2) of an object-side surface of the second lens L2 to a distance (l2) of the optical axis from the object-side surface of the second lens L2 to an imaging plane of an image sensor S. The area (A2) of the object-side surface of the second lens L2 refers to the total area of the object-side surface of the second lens L2 (the sum of an area of an optical portion and an area of a flange portion).

In Conditional Expression 4-3, ZS3 refers to a ratio (A3/l3) of an area (A3) of an object-side surface of the third lens L3 to a distance (l3) of the optical axis from the object-side surface of the third lens L3 to an imaging plane of an image sensor S. The area (A3) of the object-side surface of the third lens L3 refers to the total area of the object-side surface of the third lens L3 (the sum of an area of an optical portion and an area of a flange portion).

In the fourth embodiment, the first lens L1 to the third lens L3 satisfy at least one of the following Conditional Expressions 4-4 and 4-5.

| 86.2 degrees<α<116.0 degrees | [Conditional Expression 4-4] |
| 0.53<AR<0.73 | [Conditional Expression 4-5] |

In Conditional Expression 4-4, α refers to an angle between the first imaginary line (P1) and the second imaginary line (P2) of the first lens L1.

In Conditional Expression 4-5, AR refers to an aspect ratio of the object-side surface of the first lens L1. AR refers to a ratio of a length of the minor axis (b) of the first lens L1 to a length of the major axis (a) of the first lens L1.

An angle between the first imaginary line and the second imaginary line of the second lens L2 and the third lens L3, and an aspect ratio of the object-side surface of the second lens L2 and the third lens L3 refer to the same characteristics as previously described with regard to the first lens L1.

The first lens L1 satisfies at least one of the following Conditional Expressions 4-6 to 4-8.

| 0.855 mm<ZS'1<1.089 mm | [Conditional Expression 4-6] |
| 79.1 degrees<α'1<110.3 degrees | [Conditional Expression 4-7] |
| 0.571<AR'1<0.771 | [Conditional Expression 4-8] |

In Conditional Expression 4-6, ZS'1 refers to a ratio (A1/l1) of an area (A'1) of an object-side surface of the first lens L1 to a distance (l1) of the optical axis from the object-side surface of the first lens L1 to an imaging plane of an image sensor S. The area (A'1) of the object-side surface of the first lens L1 refers to an area of the optical portion 10 in the object-side surface of the first lens L1.

In Conditional Expression 4-7, α'1 refers to an angle between a first imaginary line (P1') connecting an optical axis and a connection point between a first edge 11 and a fourth edge 14 of the optical portion 10 of the first lens L1 and a second imaginary line (P2') connecting an optical axis and a connection point between a second edge 12 and a fourth edge 14 of the optical portion 10 of the first lens L1.

In Conditional Expression 4-8, AR'1 refers to an aspect ratio of the optical portion 10 in the object-side surface of the first lens L1. AR'1 refers to a ratio of a length of the minor axis (d) of the optical portion 10 of the first lens L1 to a length of the major axis (c) of the optical portion 10 of the first lens L1.

The second lens L2 satisfies at least one of the following Conditional Expressions 4-9 to 4-11.

| 0.866 mm<ZS'2<1.052 mm | [Conditional Expression 4-9] |
| 62.4 degrees<α'2<98.1 degrees | [Conditional Expression 4-10] |
| 0.655<AR'2<0.855 | [Conditional Expression 4-11] |

In Conditional Expression 4-9, ZS'2 refers to a ratio (A'2/l2) of an area (A'2) of an object-side surface of the second lens L2 to a distance (l2) of the optical axis from the object-side surface of the second lens L2 to an imaging plane of an image sensor S. The area (A'2) of the object-side surface of the second lens L2 refers to an area of the optical portion in the object-side surface of the second lens L2.

In Conditional Expression 4-10, α'2 refers to an angle between a first imaginary line connecting an optical axis and a connection point between a first edge and a fourth edge of the optical portion of the second lens L2 and a second imaginary line connecting an optical axis and a connection point between a second edge and a fourth edge of the optical portion of the second lens L2.

In Conditional Expression 4-11, AR'2 refers to an aspect ratio of the optical portion in the object-side surface of the second lens L2. AR'2 refers to a ratio of a length of the minor axis of the optical portion of the second lens L2 to a length of the major axis of the optical portion of the second lens L2.

The third lens L3 satisfies at least one of the following Conditional Expressions 4-12 to 4-14.

| 0.764 mm<ZS'3<0.801 mm | [Conditional Expression 4-12] |
| 0 degree<α'3<55.5 degrees | [Conditional Expression 4-13] |
| 0.885<AR'3<1.000 | [Conditional Expression 4-14] |

In Conditional Expression 4-12, ZS'3 refers to a ratio (A'3/l3) of an area (A'3) of an object-side surface of the third lens L3 to a distance (l3) of the optical axis from the object-side surface of the third lens L3 to an imaging plane of an image sensor S. The area (A'3) of the object-side surface of the third lens L3 refers to an area of an optical portion in the object-side surface of the third lens L3.

In Conditional Expression 4-13, α'3 refers to an angle between a first imaginary line connecting an optical axis and a connection point between a first edge and a fourth edge of the optical portion of the third lens L3 and a second imaginary line connecting an optical axis and a connection point between a second edge and a fourth edge of the optical portion of the third lens L3.

In Conditional Expression 4-14, AR'3 refers to an aspect ratio of the optical portion in the object-side surface of the third lens L3. AR'3 refers to a ratio of a length of the minor axis of the optical portion of the third lens L3 to a length of the major axis of the optical portion of the third lens L3.

The following Table 4 illustrates embodiments of the lens assembly 2 satisfying the above Conditional Expressions 4-1 to 4-14.

TABLE 4

| Lens | Total Track Length (l) | Object-Side Surface | | | | Optical Portion of Object-Side Surface | | | |
|------|------------------------|------|---------|--------|-------|-------|--------|--------|-------|
|      |                        | AR   | α       | A      | ZS    | AR'   | α'     | A'     | ZS'   |
| L1   | 24.207                 | 0.630 | 101.886 | 30.934 | 1.278 | 0.671 | 95.696 | 23.693 | 0.979 |
| L2   | 21.169                 | 0.630 | 101.886 | 30.934 | 1.461 | 0.755 | 81.867 | 20.487 | 0.968 |
| L3   | 17.501                 | 0.630 | 101.886 | 30.934 | 1.768 | 0.985 | 19.938 | 13.981 | 0.799 |

The first lens L1 and the second lens L2 are configured to be aligned with respect to each other. For example, the first lens L1 and the second lens L2 are coupled to each other to align their optical axes.

A flange portion of an image-side surface of the first lens L1 and a flange portion of an object-side surface of the second lens L2 have a concavo-convex structure, respectively, and the concavo-convex structure of the first lens L1 and the concavo-convex structure of the second lens L2 are configured to be coupled to each other such that the optical axis is aligned.

Further, the second lens L2 and the third lens L3 are configured to be aligned with respect to each other. For example, the second lens L2 and the third lens L3 are coupled to each other to align their optical axes.

A flange portion of an image-side surface of the second lens L2 and a flange portion of an object-side surface of the third lens L3 have a concavo-convex structure, respectively, and the concavo-convex structure of the second lens L2 and the concavo-convex structure of the third lens L3 are configured to be coupled to each other such that the optical axis is aligned.

As a fifth embodiment of a lens assembly 2, a case in which all of a plurality of lenses are non-circular, and a length of a relative long side of the image sensor S is 1.5 times or more a length of a relative short side of the image sensor S will be described. For example, a ratio of the length of the relative long side to the relative short side of the image sensor S is 16:9, 18:9, or 19:9. The plurality of lenses include a first lens L1 to a fifth lens L5, and the lens assembly 2, in the fifth embodiment of the lens assembly 2, has a fixed focal length.

Further, the lens assembly 2 has an FNO of 4.0. FNO refers to a constant indicating brightness of a lens assembly 2.

The first lens L1 satisfies the following Conditional Expression 5-1, the second lens L2 satisfies the following Conditional Expression 5-2, the third lens L3 satisfies the following Conditional Expression 5-3, the fourth lens L4 satisfies the following Conditional Expression 5-4, and the fifth lens L5 satisfies the following Conditional Expression 5-5.

0.916 mm<ZS1<1.284 mm    [Conditional Expression 5-1]

1.048 mm<ZS2<1.468 mm    [Conditional Expression 5-2]

1.267 mm<ZS3<1.776 mm    [Conditional Expression 5-3]

1.352 mm<ZS4<1.895 mm    [Conditional Expression 5-4]

1.572 mm<ZS5<2.203 mm    [Conditional Expression 5-5]

In Conditional Expression 5-1, ZS1 refers to a ratio (A1/l1) of an area (A1) of an object-side surface of the first lens L1 to a distance (l1) of the optical axis from the object-side surface of the first lens L1 to an imaging plane of an image sensor S. The area (A1) of the object-side surface of the first lens L1 refers to the total area of the object-side surface of the first lens L1 (the sum of an area of an optical portion and an area of a flange portion).

In Conditional Expression 5-2, ZS2 refers to a ratio (A2/l2) of an area (A2) of an object-side surface of the second lens L2 to a distance (l2) of the optical axis from the object-side surface of the second lens L2 to an imaging plane of an image sensor S. The area (A2) of the object-side surface of the second lens L2 refers to the total area of the object-side surface of the second lens L2 (the sum of an area of an optical portion and an area of a flange portion).

In Conditional Expression 5-3, ZS3 refers to a ratio (A3/l3) of an area (A3) of an object-side surface of the third lens L3 to a distance (l3) of the optical axis from the object-side surface of the third lens L3 to an imaging plane of an image sensor S. The area (A3) of the object-side surface of the third lens L3 refers to the total area of the object-side surface of the third lens L3 (the sum of an area of an optical portion and an area of a flange portion).

In Conditional Expression 5-4, ZS4 refers to a ratio (A4/l4) of an area (A4) of an object-side surface of the fourth lens L4 to a distance (l4) of the optical axis from the object-side surface of the fourth lens L4 to an imaging plane of an image sensor S. The area (A4) of the object-side surface of the fourth lens L4 refers to the total area of the object-side surface of the fourth lens L4 (the sum of an area of an optical portion and an area of a flange portion).

In Conditional Expression 5-5, ZS5 refers to a ratio (A5/l5) of an area (A5) of an object-side surface of the fifth lens L5 to a distance (l5) of the optical axis from the object-side surface of the fifth lens L5 to an imaging plane of an image sensor S. The area (A5) of the object-side surface of the fifth lens L5 refers to the total area of the object-side surface of the fifth lens L5 (the sum of an area of an optical portion and an area of a flange portion).

In the fifth embodiment, the first lens L1 to the fifth lens L5 satisfy at least one of the following Conditional Expressions 5-6 and 5-7.

101.3 degrees<α<128.6 degrees    [Conditional Expression 5-6]

0.434<AR<0.634    [Conditional Expression 5-7]

In Conditional Expression 5-6, α refers to an angle between the first imaginary line (P1) and the second imaginary line (P2) of the first lens L1.

In Conditional Expression 5-7, AR refers to an aspect ratio of the object-side surface of the first lens L1. AR refers to a ratio of a length of the minor axis (b) of the first lens L1 to a length of the major axis (a) of the first lens L1.

An angle between the first imaginary line and the second imaginary line of the second lens L2 to the fifth lens L5, and an aspect ratio of the object-side surface of the second lens L2 to the fifth lens L5 refer to the same characteristics as previously described with regard to the first lens L1.

The first lens L1 satisfies at least one of the following Conditional Expressions 5-8 to 5-10.

$$0.701 \text{ mm} < ZS'1 < 0.963 \text{ mm} \quad [\text{Conditional Expression 5-8}]$$

$$97.7 \text{ degrees} < \alpha'1 < 125.5 \text{ degrees} \quad [\text{Conditional Expression 5-9}]$$

$$0.458 < AR'1 < 0.658 \quad [\text{Conditional Expression 5-10}]$$

In Conditional Expression 5-8, ZS'1 refers to a ratio (A1/l1) of an area (A'1) of an object-side surface of the first lens L1 to a distance (l1) of the optical axis from the object-side surface of the first lens L1 to an imaging plane of an image sensor S. The area (A'1) of the object-side surface of the first lens L1 refers to an area of the optical portion 10 in the object-side surface of the first lens L1.

In Conditional Expression 5-9, α'1 refers to an angle between a first imaginary line (P1') connecting an optical axis and a connection point between a first edge 11 and a fourth edge 14 of the optical portion 10 of the first lens L1 and a second imaginary line (P2') connecting an optical axis and a connection point between a second edge 12 and a fourth edge 14 of the optical portion 10 of the first lens L1.

In Conditional Expression 5-10, AR'1 refers to an aspect ratio of the optical portion 10 in the object-side surface of the first lens L1. AR'1 refers to a ratio of a length of the minor axis (d) of the optical portion 10 of the first lens L1 to a length of the major axis (c) of the optical portion 10 of the first lens L1.

The second lens L2 satisfies at least one of the following Conditional Expressions 5-11 to 5-13.

$$0.720 \text{ mm} < ZS'2 < 0.942 \text{ mm} \quad [\text{Conditional Expression 5-11}]$$

$$86.5 \text{ degrees} < \alpha'2 < 116.2 \text{ degrees} \quad [\text{Conditional Expression 5-12}]$$

$$0.528 < AR'2 < 0.728 \quad [\text{Conditional Expression 5-13}]$$

In Conditional Expression 5-11, ZS'2 refers to a ratio (A'2/l2) of an area (A'2) of an object-side surface of the second lens L2 to a distance (l2) of the optical axis from the object-side surface of the second lens L2 to an imaging plane of an image sensor S. The area (A'2) of the object-side surface of the second lens L2 refers to an area of the optical portion in the object-side surface of the second lens L2.

In Conditional Expression 5-12, α'2 refers to an angle between a first imaginary line connecting an optical axis and a connection point between a first edge and a fourth edge of the optical portion of the second lens L2 and a second imaginary line connecting an optical axis and a connection point between a second edge and a fourth edge of the optical portion of the second lens L2.

In Conditional Expression 5-13, AR'2 refers to an aspect ratio of the optical portion in the object-side surface of the second lens L2. AR'2 refers to a ratio of a length of the minor axis of the optical portion of the second lens L2 to a length of the major axis of the optical portion of the second lens L2.

The third lens L3 satisfies at least one of the following Conditional Expressions 5-14 to 5-16.

$$0.664 \text{ mm} < ZS'3 < 0.779 \text{ mm} \quad [\text{Conditional Expression 5-14}]$$

$$46.4 \text{ degrees} < \alpha'3 < 88.0 \text{ degrees} \quad [\text{Conditional Expression 5-15}]$$

$$0.719 < AR'3 < 0.919 \quad [\text{Conditional Expression 5-16}]$$

In Conditional Expression 5-14, ZS'3 refers to a ratio (A'3/l3) of an area (A'3) of an object-side surface of the third lens L3 to a distance (l3) of the optical axis from the object-side surface of the third lens L3 to an imaging plane of an image sensor S. The area (A'3) of the object-side surface of the third lens L3 refers to an area of an optical portion in the object-side surface of the third lens L3.

In Conditional Expression 5-15, α'3 refers to an angle between a first imaginary line connecting an optical axis and a connection point between a first edge and a fourth edge of the optical portion of the third lens L3 and a second imaginary line connecting an optical axis and a connection point between a second edge and a fourth edge of the optical portion of the third lens L3.

In Conditional Expression 5-16, AR'3 refers to an aspect ratio of the optical portion in the object-side surface of the third lens L3. AR'3 refers to a ratio of a length of the minor axis of the optical portion of the third lens L3 to a length of the major axis of the optical portion of the third lens L3.

The fourth lens L4 satisfies at least one of the following Conditional Expressions 5-17 to 5-19.

$$0.685 \text{ mm} < ZS'4 < 0.792 \text{ mm} \quad [\text{Conditional Expression 5-17}]$$

$$38.5 \text{ degrees} < \alpha'4 < 83.8 \text{ degrees} \quad [\text{Conditional Expression 5-18}]$$

$$0.744 < AR'4 < 0.944 \quad [\text{Conditional Expression 5-19}]$$

In Conditional Expression 5-17, ZS'4 refers to a ratio (A'4/l4) of an area (A'4) of an object-side surface of the fourth lens L4 to a distance (l4) of the optical axis from the object-side surface of the fourth lens L4 to an imaging plane of an image sensor S. The area (A'4) of the object-side surface of the fourth lens L4 refers to an area of an optical portion in the object-side surface of the fourth lens L4.

In Conditional Expression 5-18, α'4 refers to an angle between a first imaginary line connecting an optical axis and a connection point between a first edge and a fourth edge of the optical portion of the fourth lens L4 and a second imaginary line connecting an optical axis and a connection point between a second edge and a fourth edge of the optical portion of the fourth lens L4.

In Conditional Expression 5-19, AR'4 refers to an aspect ratio of the optical portion in the object-side surface of the fourth lens L4. AR'4 refers to a ratio of a length of the minor axis of the optical portion of the fourth lens L4 to a length of the major axis of the optical portion of the fourth lens L4.

The fifth lens L5 satisfies at least one of the following Conditional Expressions 5-20 to 5-22.

$$0.790 \text{ mm} < ZS'5 < 0.911 \text{ mm} \quad [\text{Conditional Expression 5-20}]$$

$$36.5 \text{ degrees} < \alpha'5 < 82.9 \text{ degrees} \quad [\text{Conditional Expression 5-21}]$$

$$0.750 < AR'5 < 0.950 \quad [\text{Conditional Expression 5-22}]$$

In Conditional Expression 5-20, ZS'5 refers to a ratio (A'5/l5) of an area (A'5) of an object-side surface of the fifth lens L5 to a distance (l5) of the optical axis from the object-side surface of the fifth lens L5 to an imaging plane of an image sensor S. The area (A'5) of the object-side surface of the fifth lens L5 refers to an area of an optical portion in the object-side surface of the fifth lens L5.

In Conditional Expression 5-21, α'5 refers to an angle between a first imaginary line connecting an optical axis and a connection point between a first edge and a fourth edge of the optical portion of the fifth lens L5 and a second imaginary line connecting an optical axis and a connection point between a second edge and a fourth edge of the optical portion of the fifth lens L5.

In Conditional Expression 5-22, AR'5 refers to an aspect ratio of the optical portion in the object-side surface of the fifth lens L5. AR'5 refers to a ratio of a length of the minor axis of the optical portion of the fifth lens L5 to a length of the major axis of the optical portion of the fifth lens L5.

The following Table 5 illustrates an embodiment of the lens assembly 2 satisfying the above Conditional Expressions 5-1 to 5-22.

TABLE 5

| Lens | Total Track Length (I) | Object-Side Surface | | | | Optical Portion of Object-Side Surface | | | |
|------|------------------------|------|---------|--------|-------|-------|---------|--------|-------|
|      |                        | AR   | α       | A      | ZS    | AR'   | α'      | A'     | ZS'   |
| L1   | 24.207                 | 0.534 | 115.476 | 26.800 | 1.107 | 0.558 | 112.141 | 20.275 | 0.838 |
| L2   | 21.169                 | 0.534 | 115.476 | 26.800 | 1.266 | 0.628 | 102.144 | 17.711 | 0.837 |
| L3   | 17.501                 | 0.534 | 115.476 | 26.800 | 1.531 | 0.819 | 69.996  | 12.754 | 0.729 |
| L4   | 16.402                 | 0.534 | 115.476 | 26.800 | 1.634 | 0.844 | 64.862  | 12.246 | 0.747 |
| L5   | 14.107                 | 0.534 | 115.476 | 26.800 | 1.900 | 0.850 | 63.650  | 12.134 | 0.860 |

The first lens L1 and the second lens L2 are configured to be aligned with respect to each other. For example, the first lens L1 and the second lens L2 are coupled to each other to align their optical axes.

A flange portion of an image-side surface of the first lens L1 and a flange portion of an object-side surface of the second lens L2 have a concavo-convex structure, respectively, and the concavo-convex structure of the first lens L1 and the concavo-convex structure of the second lens L2 are configured to be coupled to each other such that the optical axis is aligned.

As a sixth embodiment of a lens assembly 2, a case in which all of a plurality of lenses are non-circular, and a length of a relative long side of the image sensor S is 1.5 times or more a length of a relative short side of the image sensor S will be described. For example, a ratio of the length of the relative long side to the relative short side of the image sensor S is 16:9, 18:9, or 19:9. The plurality of lenses include a first lens L1 to a seventh lens L7, and the lens assembly 2, in the sixth embodiment of the lens assembly 2, has a variable focal length. In this case, the lens assembly 2 of the sixth embodiment may change a focal length of the lens assembly 2 by moving at least a portion of the lenses to change a distance between the lenses.

Further, the lens assembly 2 has an FNO of 4.0. FNO refers to a constant indicating brightness of a lens assembly 2.

The first lens L1 satisfies the following Conditional Expression 6-1, the second lens L2 satisfies the following Conditional Expression 6-2, the third lens L3 satisfies the following Conditional Expression 6-3, the fourth lens L4 satisfies the following Conditional Expression 6-4, the fifth lens L5 satisfies the following Conditional Expression 6-5, the sixth lens L6 satisfies the following Conditional Expression 6-6, and the seventh lens L7 satisfies the following Conditional Expression 6-7.

0.920 mm<ZS1<1.355 mm    [Conditional Expression 6-1]

0.994 mm<ZS2<1.464 mm    [Conditional Expression 6-2]

1.152 mm<ZS3<1.697 mm    [Conditional Expression 6-3]

1.296 mm<ZS4<1.910 mm    [Conditional Expression 6-4]

1.469 mm<ZS5<2.163 mm    [Conditional Expression 6-5]

2.291 mm<ZS6<3.374 mm    [Conditional Expression 6-6]

2.796 mm<ZS7<4.118 mm    [Conditional Expression 6-7]

In Conditional Expression 6-1, ZS1 refers to a ratio (A1/l1) of an area (A1) of an object-side surface of the first lens L1 to a distance (l1) of the optical axis from the object-side surface of the first lens L1 to an imaging plane of an image sensor S. The area (A1) of the object-side surface of the first lens L1 refers to the total area of the object-side surface of the first lens L1 (the sum of an area of an optical portion and an area of a flange portion).

In Conditional Expression 6-2, ZS2 refers to a ratio (A2/l2) of an area (A2) of an object-side surface of the second lens L2 to a distance (l2) of the optical axis from the object-side surface of the second lens L2 to an imaging plane of an image sensor S. The area (A2) of the object-side surface of the second lens L2 refers to the total area of the object-side surface of the second lens L2 (the sum of an area of an optical portion and an area of a flange portion).

In Conditional Expression 6-3, ZS3 refers to a ratio (A3/l3) of an area (A3) of an object-side surface of the third lens L3 to a distance (l3) of the optical axis from the object-side surface of the third lens L3 to an imaging plane of an image sensor S. The area (A3) of the object-side surface of the third lens L3 refers to the total area of the object-side surface of the third lens L3 (the sum of an area of an optical portion and an area of a flange portion).

In Conditional Expression 6-4, ZS4 refers to a ratio (A4/l4) of an area (A4) of an object-side surface of the fourth lens L4 to a distance (l4) of the optical axis from the object-side surface of the fourth lens L4 to an imaging plane of an image sensor S. The area (A4) of the object-side surface of the fourth lens L4 refers to the total area of the object-side surface of the fourth lens L4 (the sum of an area of an optical portion and an area of a flange portion).

In Conditional Expression 6-5, ZS5 refers to a ratio (A5/l5) of an area (A5) of an object-side surface of the fifth lens L5 to a distance (l5) of the optical axis from the object-side surface of the fifth lens L5 to an imaging plane of an image sensor S. The area (A5) of the object-side surface of the fifth lens L5 refers to the total area of the object-side surface of the fifth lens L5 (the sum of an area of an optical portion and an area of a flange portion).

In Conditional Expression 6-6, ZS6 refers to a ratio (A6/l6) of an area (A6) of an object-side surface of the sixth lens L6 to a distance (l6) of the optical axis from the object-side surface of the sixth lens L6 to an imaging plane of an image sensor S. The area (A6) of the object-side surface of the sixth lens L6 refers to the total area of the object-side surface of the sixth lens L6 (the sum of an area of an optical portion and an area of a flange portion).

In Conditional Expression 6-7, ZS7 refers to a ratio (A7/l7) of an area (A7) of an object-side surface of the seventh lens L7 to a distance (l7) of the optical axis from the object-side surface of the seventh lens L7 to an imaging plane of an image sensor S. The area (A7) of the object-side surface of the seventh lens L7 refers to the total area of the object-side surface of the seventh lens L7 (the sum of an area of an optical portion and an area of a flange portion).

In the sixth embodiment, the first lens L1 to the seventh lens L7 satisfies at least one of the following Conditional Expressions 6-8 and 6-9.

$$109.2 \text{ degrees} < \alpha < 135.4 \text{ degrees} \quad \text{[Conditional Expression 6-8]}$$

$$0.379 < AR < 0.579 \quad \text{[Conditional Expression 6-9]}$$

In Conditional Expression 6-8, a refers to an angle between the first imaginary line (P1) and the second imaginary line (P2) of the first lens L1.

In Conditional Expression 6-9, AR refers to an aspect ratio of the object-side surface of the first lens L1. AR refers to a ratio of a length of the minor axis (b) of the first lens L1 to a length of the major axis (a) of the first lens L1.

An angle between the first imaginary line and the second imaginary line of the second lens L2 to the seventh lens L7, and an aspect ratio of the object-side surface of the second lens L2 to the seventh lens L7 refer to the same characteristics as previously described with regard to the first lens L1.

The first lens L1 satisfies at least one of the following Conditional Expressions 6-10 to 6-12.

$$0.630 \text{ mm} < ZS'1 < 0.855 \text{ mm} \quad \text{[Conditional Expression 6-10]}$$

$$95.1 \text{ degrees} < \alpha'1 < 123.3 \text{ degrees} \quad \text{[Conditional Expression 6-11]}$$

$$0.475 < AR'1 < 0.675 \quad \text{[Conditional Expression 6-11]}$$

In Conditional Expression 6-10, ZS'1 refers to a ratio (A1/l1) of an area (A'1) of an object-side surface of the first lens L1 to a distance (l1) of the optical axis from the object-side surface of the first lens L1 to an imaging plane of an image sensor S. The area (A'1) of the object-side surface of the first lens L1 refers to an area of the optical portion 10 in the object-side surface of the first lens L1.

In Conditional Expression 6-11, α'1 refers to an angle between a first imaginary line (P1') connecting an optical axis and a connection point between a first edge 11 and a fourth edge 14 of the optical portion 10 of the first lens L1 and a second imaginary line (P2') connecting an optical axis and a connection point between a second edge 12 and a fourth edge 14 of the optical portion 10 of the first lens L1.

In Conditional Expression 6-12, AR'1 refers to an aspect ratio of the optical portion 10 in the object-side surface of the first lens L1. AR'1 refers to a ratio of a length of the minor axis (d) of the optical portion 10 of the first lens L1 to a length of the major axis (c) of the optical portion 10 of the first lens L1.

The second lens L2 satisfies at least one of the following Conditional Expressions 6-13 to 6-15.

$$0.646 \text{ mm} < ZS'2 < 0.856 \text{ mm} \quad \text{[Conditional Expression 6-13]}$$

$$89.7 \text{ degrees} < \alpha'2 < 118.8 \text{ degrees} \quad \text{[Conditional Expression 6-14]}$$

$$0.509 < AR'2 < 0.709 \quad \text{[Conditional Expression 6-15]}$$

In Conditional Expression 6-13, ZS'2 refers to a ratio (A'2/l2) of an area (A'2) of an object-side surface of the second lens L2 to a distance (l2) of the optical axis from the object-side surface of the second lens L2 to an imaging plane of an image sensor S. The area (A'2) of the object-side surface of the second lens L2 refers to an area of the optical portion in the object-side surface of the second lens L2.

In Conditional Expression 6-14, α'2 refers to an angle between a first imaginary line connecting an optical axis and a connection point between a first edge and a fourth edge of the optical portion of the second lens L2 and a second imaginary line connecting an optical axis and a connection point between a second edge and a fourth edge of the optical portion of the second lens L2.

In Conditional Expression 6-15, AR'2 refers to an aspect ratio of the optical portion in the object-side surface of the second lens L2. AR'2 refers to a ratio of a length of the minor axis of the optical portion of the second lens L2 to a length of the major axis of the optical portion of the second lens L2.

The third lens L3 satisfies at least one of the following Conditional Expressions 6-16 to 6-18.

$$0.807 \text{ mm} < ZS'3 < 1.108 \text{ mm} \quad \text{[Conditional Expression 6-16]}$$

$$97.4 \text{ degrees} < \alpha'3 < 125.2 \text{ degrees} \quad \text{[Conditional Expression 6-17]}$$

$$0.460 < AR'3 < 0.660 \quad \text{[Conditional Expression 6-18]}$$

In Conditional Expression 6-16, ZS'3 refers to a ratio (A'3/l3) of an area (A'3) of an object-side surface of the third lens L3 to a distance (l3) of the optical axis from the object-side surface of the third lens L3 to an imaging plane of an image sensor S. The area (A'3) of the object-side surface of the third lens L3 refers to an area of an optical portion in the object-side surface of the third lens L3.

In Conditional Expression 6-17, α'3 refers to an angle between a first imaginary line connecting an optical axis and a connection point between a first edge and a fourth edge of the optical portion of the third lens L3 and a second imaginary line connecting an optical axis and a connection point between a second edge and a fourth edge of the optical portion of the third lens L3.

In Conditional Expression 6-18, AR'3 refers to an aspect ratio of the optical portion in the object-side surface of the third lens L3. AR'3 refers to a ratio of a length of the minor axis of the optical portion of the third lens L3 to a length of the major axis of the optical portion of the third lens L3.

The fourth lens L4 satisfies at least one of the following Conditional Expressions 6-19 to 6-21.

$$0.828 \text{ mm} < ZS'4 < 1.089 \text{ mm} \quad \text{[Conditional Expression 6-19]}$$

$$87.8 \text{ degrees} < \alpha'4 < 117.3 \text{ degrees} \quad \text{[Conditional Expression 6-20]}$$

$$0.521 < AR'4 < 0.721 \quad \text{[Conditional Expression 6-21]}$$

In Conditional Expression 6-19, ZS'4 refers to a ratio (A'4/l4) of an area (A'4) of an object-side surface of the fourth lens L4 to a distance (l4) of the optical axis from the object-side surface of the fourth lens L4 to an imaging plane of an image sensor S. The area (A'4) of the object-side surface of the fourth lens L4 refers to an area of an optical portion in the object-side surface of the fourth lens L4.

In Conditional Expression 6-20, α'4 refers to an angle between a first imaginary line connecting an optical axis and a connection point between a first edge and a fourth edge of the optical portion of the fourth lens L4 and a second imaginary line connecting an optical axis and a connection point between a second edge and a fourth edge of the optical portion of the fourth lens L4.

In Conditional Expression 6-21, AR'4 refers to an aspect ratio of the optical portion in the object-side surface of the fourth lens L4. AR'4 refers to a ratio of a length of the minor axis of the optical portion of the fourth lens L4 to a length of the major axis of the optical portion of the fourth lens L4.

The fifth lens L5 satisfies at least one of the following Conditional Expressions 6-22 to 6-24.

$$0.909 \text{ mm} < ZS'5 < 1.179 \text{ mm} \quad \text{[Conditional Expression 6-22]}$$

$$84.3 \text{ degrees} < \alpha'5 < 114.4 \text{ degrees} \quad \text{[Conditional Expression 6-23]}$$

$$0.542 < AR'5 < 0.742 \quad \text{[Conditional Expression 6-24]}$$

In Conditional Expression 6-22, ZS'5 refers to a ratio (A'5/l5) of an area (A'5) of an object-side surface of the fifth lens L5 to a distance (l5) of the optical axis from the object-side surface of the fifth lens L5 to an imaging plane of an image sensor S. The area (A'5) of the object-side surface of the fifth lens L5 refers to an area of an optical portion in the object-side surface of the fifth lens L5.

In Conditional Expression 6-23, α'5 refers to an angle between a first imaginary line connecting an optical axis and a connection point between a first edge and a fourth edge of the optical portion of the fifth lens L5 and a second imaginary line connecting an optical axis and a connection point between a second edge and a fourth edge of the optical portion of the fifth lens L5.

In Conditional Expression 6-24, AR'5 refers to an aspect ratio of the optical portion in the object-side surface of the fifth lens L5. AR'5 refers to a ratio of a length of the minor axis of the optical portion of the fifth lens L5 to a length of the major axis of the optical portion of the fifth lens L5.

The sixth lens L6 satisfies at least one of the following Conditional Expressions 6-25 to 6-27.

1.502 mm<ZS'6<1.997 mm        [Conditional Expression 6-25]

90.6 degrees<α'6<119.5 degrees   [Conditional Expression 6-26]

0.503<AR'6<0.703              [Conditional Expression 6-27]

In Conditional Expression 6-25, ZS'6 refers to a ratio (A'6/l6) of an area (A'6) of an object-side surface of the sixth lens L6 to a distance (l6) of the optical axis from the object-side surface of the sixth lens L6 to an imaging plane of an image sensor S. The area (A'6) of the object-side surface of the sixth lens L6 refers to an area of an optical portion in the object-side surface of the sixth lens L6.

In Conditional Expression 6-26, α'6 refers to an angle between a first imaginary line connecting an optical axis and a connection point between a first edge and a fourth edge of the optical portion of the sixth lens L6 and a second imaginary line connecting an optical axis and a connection point between a second edge and a fourth edge of the optical portion of the sixth lens L6.

In Conditional Expression 6-27, AR'6 refers to an aspect ratio of the optical portion in the object-side surface of the sixth lens L6. AR'6 refers to a ratio of a length of the minor axis of the optical portion of the sixth lens L6 to a length of the major axis of the optical portion of the sixth lens L6.

The seventh lens L7 satisfies at least one of the following Conditional Expressions 6-28 to 6-30.

1.946 mm<ZS'7<2.662 mm        [Conditional Expression 6-28]

96.7 degrees<α'7<124.7 degrees   [Conditional Expression 6-29]

0.464<AR'7<0.664              [Conditional Expression 6-30]

In Conditional Expression 6-28, ZS'7 refers to a ratio (A'7/l7) of an area (A'7) of an object-side surface of the seventh lens L7 to a distance (l7) of the optical axis from the object-side surface of the seventh lens L7 to an imaging plane of an image sensor S. The area (A'7) of the object-side surface of the seventh lens L7 refers to an area of an optical portion in the object-side surface of the seventh lens L7.

In Conditional Expression 6-29, α'7 refers to an angle between a first imaginary line connecting an optical axis and a connection point between a first edge and a fourth edge of the optical portion of the seventh lens L7 and a second imaginary line connecting an optical axis and a connection point between a second edge and a fourth edge of the optical portion of the seventh lens L7.

In Conditional Expression 6-30, AR'7 refers to an aspect ratio of the optical portion in the object-side surface of the seventh lens L7. AR'7 refers to a ratio of a length of the minor axis of the optical portion of the seventh lens L7 to a length of the major axis of the optical portion of the seventh lens L7.

The following Table 6 illustrates an embodiment of the lens assembly 2 satisfying the above Conditional Expressions 6-1 to 6-30.

TABLE 6

| Lens | Total Track Length (l) | Object-Side Surface | | | | Optical Portion of Object-Side Surface | | | |
|---|---|---|---|---|---|---|---|---|---|
| | | AR | α | A | ZS | AR' | α' | A' | ZS' |
| L1 | 27.310 | 0.479 | 122.716 | 31.257 | 1.145 | 0.575 | 109.820 | 20.415 | 0.748 |
| L2 | 25.290 | 0.479 | 122.716 | 31.257 | 1.236 | 0.609 | 104.981 | 19.118 | 0.756 |
| L3 | 21.815 | 0.479 | 122.716 | 31.257 | 1.433 | 0.560 | 111.872 | 21.022 | 0.964 |
| L4 | 19.382 | 0.479 | 122.716 | 31.257 | 1.613 | 0.621 | 103.282 | 18.703 | 0.965 |
| L5 | 17.110 | 0.479 | 122.716 | 31.257 | 1.827 | 0.642 | 100.174 | 17.991 | 1.051 |
| L6 | 10.969 | 0.479 | 122.716 | 31.257 | 2.850 | 0.603 | 105.771 | 19.318 | 1.761 |
| L7 | 8.988 | 0.479 | 122.716 | 31.257 | 3.478 | 0.564 | 111.290 | 20.846 | 2.319 |

The first to sixth embodiments of the lens assembly 2 described above satisfy at least one of the following Conditional Expressions 7 and 8.

0.62398<ZS1/ZS2<1.36318       [Conditional Expression 7]

0.73598<ZS'1/ZS'2<1.37987     [Conditional Expression 8]

In Conditional Expression 7, ZS1 refers to a ratio (A1/l1) of an area (A1) of an object-side surface of the first lens L1 to a distance (l1) of the optical axis from the object-side surface of the first lens L1 to an imaging plane of an image sensor S. The area (A1) of the object-side surface of the first lens L1 refers to the total area of the object-side surface of the first lens L1 (the sum of an area of an optical portion and an area of a flange portion).

Further, ZS2 refers to a ratio (A2/l2) of an area (A2) of an object-side surface of the second lens L2 to a distance (l2) of the optical axis from the object-side surface of the second lens L2 to an imaging plane of an image sensor S. The area (A2) of the object-side surface of the second lens L2 refers to the total area of the object-side surface of the second lens L2 (the sum of an area of an optical portion and an area of a flange portion).

In Conditional Expression 8, ZS'1 refers to a ratio (A1/l1) of an area (A'1) of an object-side surface of the first lens L1 to a distance (l1) of the optical axis from the object-side surface of the first lens L1 to an imaging plane of an image sensor S. The area (A'1) of the object-side surface of the first lens L1 refers to an area of the optical portion 10 in the object-side surface of the first lens L1.

Further, ZS'2 refers to a ratio (A'2/l2) of an area (A'2) of an object-side surface of the second lens L2 to a distance (l2) of the optical axis from the object-side surface of the second lens L2 to an imaging plane of an image sensor S. The area (A'2) of the object-side surface of the second lens L2 refers to an area of the optical portion in the object-side surface of the second lens L2.

Next, an optical imaging system 3 including a first lens to a fifth lens will be described with reference to FIGS. 9 to 23.

In the configuration diagrams of FIGS. 9 to 23, a thickness, a size, and a shape of a lens may be exaggerated for the sake of explanation. For example, a shape of a spherical or non-spherical surface of the lens illustrated in the configuration diagram may be illustrated as an example, and is not limited thereto.

In the lens, a first surface refers to a relatively closer surface to an object side (or an object-side surface), and a second surface refers to a relatively closer surface to an image side (or an image-side surface). In this specification, numerical values regarding radii of curvature of a lens, thickness of a lens, distance between lenses, effective aperture radius, and the like are expressed in millimeters (mm), and angles are expressed in degrees.

In addition, in explanation of the shape of the lens, a convex shape of one surface refers to a paraxial region of the surface being convex, and a concave shape of one surface refers to a paraxial region of the surface being concave. Therefore, even when one surface of a lens is described as a convex shape, an edge portion of the lens may be concave. Similarly, even when one surface of a lens is described as a concave shape, an edge portion of the lens may be convex.

The paraxial region refers to a relatively very narrow region adjacent to and including an optical axis.

All lenses constituting an optical imaging system 3 according to an embodiment of the present disclosure may be made of a plastic material.

At least a portion of a first lens L1 to a fifth lens L5 constituting the optical imaging system 3 may have a non-circular planar shape. For example, the first lens L1 and the second lens L2 may be formed in a non-circular shape, and the third lens L3 to the fifth lens L5 may be formed in a circular shape.

Effective radius of the non-circular lens may be formed larger than effective radius of the other lenses.

Effective aperture radius refers to radius of one surface (an object-side surface and an image-side surface) of a lens through which light actually passes. For example, the effective radius refers to radius of an optical portion of a lens.

Since the first lens L1 may be non-circular, effective radius of the first lens L1 may have the maximum effective radius (half of a relative long axis (c)) and the minimum effective radius (half of a relative short axis (d)). In this specification, effective radius of a non-circular lens refers to the maximum effective radius.

A plurality of lenses may have at least one non-spherical surface, respectively.

For example, at least one of a first surface and a second surface of the first lens L1 to the fifth lens L5 may be a non-spherical surface. Here, the non-spherical surface of the first lens L1 to the fifth lens L5 may be expressed by Equation 1.

$$Z = \frac{cY^2}{1 + \sqrt{1-(1+K)c^2Y^2}} + AY^4 + BY^6 + CY^8 + DY^{10} + EY^{12} \quad \text{Equation 1}$$

In Equation 1, c is a curvature of a lens (an inverse of a radius of curvature of the lens), K is a conic constant, Y is a distance from a certain point on a non-spherical surface of the lens to an optical axis of the lens. Further, A to E are non-spherical constants. In addition, Z (or sag) is a distance from a certain point on the non-spherical surface of the lens to an apex of the non-spherical surface of the lens in an optical axis direction.

An optical imaging system comprised of a first lens L1 to a fifth lens L5 may have positive/negative/positive/negative/positive refractive power from an object side in sequence, or may have positive/negative/positive/positive/positive refractive powers from an object side in sequence.

An optical imaging system 3 according to an embodiment of the present disclosure satisfies at least one of the following Conditional Expressions.

| | |
|---|---|
| f/IMG HT>4.9 | [Conditional Expression 9] |
| 0.8<TTL/f<1.2 | [Conditional Expression 10] |
| 1.3<TTL/BFL<3.3 | [Conditional Expression 11] |
| 0.75<f12/f<4.5 | [Conditional Expression 12] |
| 3.8<f/TD12<7 | [Conditional Expression 13] |
| ER11/ER_max>1.1 | [Conditional Expression 14] |
| ER11/ER51>1.1 | [Conditional Expression 15] |
| ER21/ER_max>1.0 | [Conditional Expression 16] |
| ER21/ER51>1.0 | [Conditional Expression 17] |
| CRA_max<18 | [Conditional Expression 18] |

In the Conditional Expressions, IMG HT refers to one-half of a diagonal length of the imaging plane of the image sensor, and TTL refers to a distance from the object-side surface of the first lens to an imaging plane of the image sensor.

f refers to the total focal length of the optical imaging system, and BFL refers to a distance along the optical axis from the image-side surface of the lens, disposed closest to the image sensor, to the imaging plane of the image sensor.

f12 refers to a combined focal length of the first lens and the second lens, and TD12 refers to a distance along the optical axis from the object-side surface of the first lens to the image-side surface of the second lens.

ER11 refers to effective radius of the object-side surface of the first lens, ER21 refers to effective radius of the object-side surface of the second lens, and ER51 refers to effective radius of the object-side surface of the lens, disposed closest to the image sensor.

ER_max refers to a maximum value among effective radius of the object-side surface and effective radius of the image-side surface of the lenses, except for the first lens and the second lens.

CRA_max refers to a maximum value of an incident angle on an imaging plane of a chief ray.

The optical imaging system 3 may improve aberration improving performance, because a plurality of lenses perform an aberration correcting function.

In addition, an optical imaging system 3 according to an embodiment of the present disclosure may have a telephoto ratio (TTL/f) of greater than 0.8 and smaller than 1.2, and thus may have a feature of a telephoto lens, and may realize a relative narrow angle of view.

An example of the first embodiment of the optical imaging system 3 will be described with reference to FIGS. 9 to 11.

The first embodiment of the optical imaging system 3 includes a first lens 110, a second lens 120, a third lens 130, a fourth lens 140, and a fifth lens 150.

Figure 9:
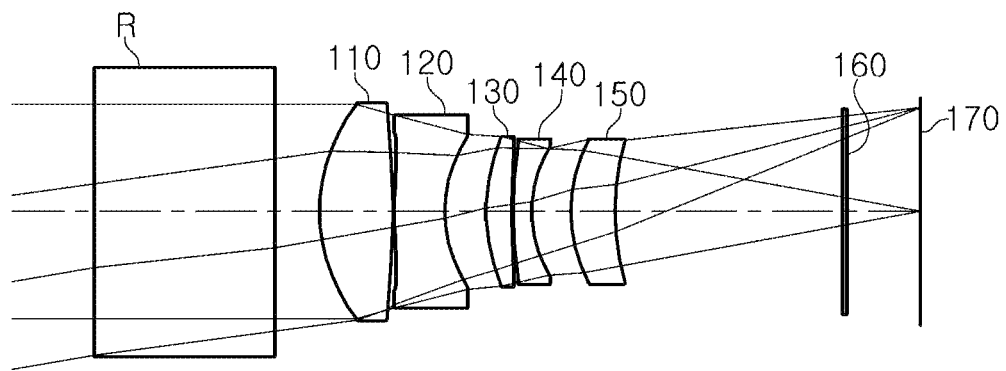
FIG. 9 is a configuration diagram of a first embodiment of an optical imaging system.

In FIG. 9, reference numeral 160 denotes an infrared light blocking filter, and reference numeral 170 denotes an image sensor.

Characteristics of a lens (a radius of curvature of a lens, a thickness of a lens, distance between lenses, a refractive index, an Abbe number, an effective aperture radius, and the like) are illustrated in Table 7.

The total focal length of the optical imaging system 3 is 15.0027 mm.

In the first embodiment of the optical imaging system 3, the first lens 110 has positive refractive power, and a first surface and a second surface of the first lens 110 are convex in the paraxial region.

A focal length of the first lens 110 is shorter than half of the total focal length, and larger than the absolute value of the focal length of the second lens 120.

The second lens 120 has negative refractive power, a first surface of the second lens 120 is convex in the paraxial region, and a second surface of the second lens 120 is concave in the paraxial region.

The third lens 130 has positive refractive power, a first surface of the third lens 130 is convex in the paraxial region, and a second surface of the third lens 130 is concave in the paraxial region.

The fourth lens 140 has negative refractive power, a first surface of the fourth lens 140 is convex in the paraxial region, and a second surface is concave in the paraxial region.

The fifth lens 150 has positive refractive power, a first surface of the fifth lens 150 is convex in the paraxial region, and a second surface is concave in the paraxial region. In addition, in a region except for the paraxial region, the first surface of the fifth lens 150 is convex, and the second surface is concave.

Surfaces of the first lens 110 to the fifth lens 150 have a non-spherical surface coefficient as illustrated in Table 8, respectively. For example, the object-side surface and the image-side surface of the first lens 110 to the fifth lens 150 are all non-spherical surfaces.

TABLE 7

| Surface No. | | Radius of Curvature | Thickness or Distance | Refractive Index | Abbe No. | Effective Aperture Radius | Focal Length |
|---|---|---|---|---|---|---|---|
| | Prism | Infinity | 4.500 | 1.7174 | 29.50 | | |
| | Prism | Infinity | 1.100 | | | | |
| S1 | 1$^{st}$ Lens | 4.3621786 | 1.850 | 1.5315 | 55.66 | 2.720 | 6.314838 |
| S2 | | −12.93311 | 0.030 | | | 2.529 | |
| S3 | 2$^{nd}$ Lens | 34.873195 | 1.250 | 1.6150 | 25.96 | 2.434 | −5.09605 |
| S4 | | 2.859842 | 1.020 | | | 1.934 | |
| S5 | 3$^{rd}$ Lens | 4.0779478 | 0.650 | 1.6707 | 19.24 | 1.867 | 7.923147 |
| S6 | | 15.773482 | 0.030 | | | 1.832 | |
| S7 | 4$^{th}$ Lens | 8.2367262 | 0.450 | 1.6150 | 25.96 | 1.812 | −6.284906 |
| S8 | | 2.5915903 | 0.970 | | | 1.700 | |
| S9 | 5$^{th}$ Lens | 3.238378 | 1.100 | 1.5441 | 56.11 | 1.800 | 10.835083 |
| S10 | | 6.2892061 | 5.670 | | | 1.788 | |
| S11 | Filter | Infinity | 0.110 | 1.5167 | 64.17 | | |
| S12 | | Infinity | 1.848 | | | | |
| S13 | Imaging Plane | Infinity | 0.002 | | | | |

TABLE 8

|   | S1 | S2 | S3 | S4 | S5 |
|---|---|---|---|---|---|
| K | −0.69940346 | 0.00000000 | 0.00000000 | 0.00000000 | 0.00000000 |
| A | 0.00098243 | 0.00228031 | −0.00561997 | −0.01357625 | −0.00988319 |
| B | 0.00003611 | −0.00002062 | 0.00075107 | 0.00075230 | 0.00132122 |
| C | −0.00000224 | −0.00000190 | −0.00006178 | −0.00022469 | −0.00018361 |
| D | 0.00000110 | −0.00000181 | 0.00000262 | 0.00005148 | −0.00001354 |
| E | −0.00000013 | 0.00000015 | 0.00000005 | −0.00000524 | 0.00000825 |

|   | S6 | S7 | S8 | S9 | S10 |
|---|---|---|---|---|---|
| K | 0.00000000 | 0.00000000 | 0.00000000 | 0.00000000 | 0.00000000 |
| A | −0.01112538 | −0.00928940 | −0.02208945 | −0.01176436 | −0.00158719 |
| B | 0.00247984 | −0.00002393 | 0.00034167 | 0.00047792 | −0.00043485 |
| C | −0.00037494 | 0.00071974 | 0.00094533 | 0.00005094 | 0.00014364 |
| D | 0.00000356 | −0.00018516 | −0.00024060 | 0.00003078 | 0.00001034 |
| E | 0.00000721 | 0.00001249 | 0.00001173 | −0.00000543 | −0.00000172 |

Figure 10:
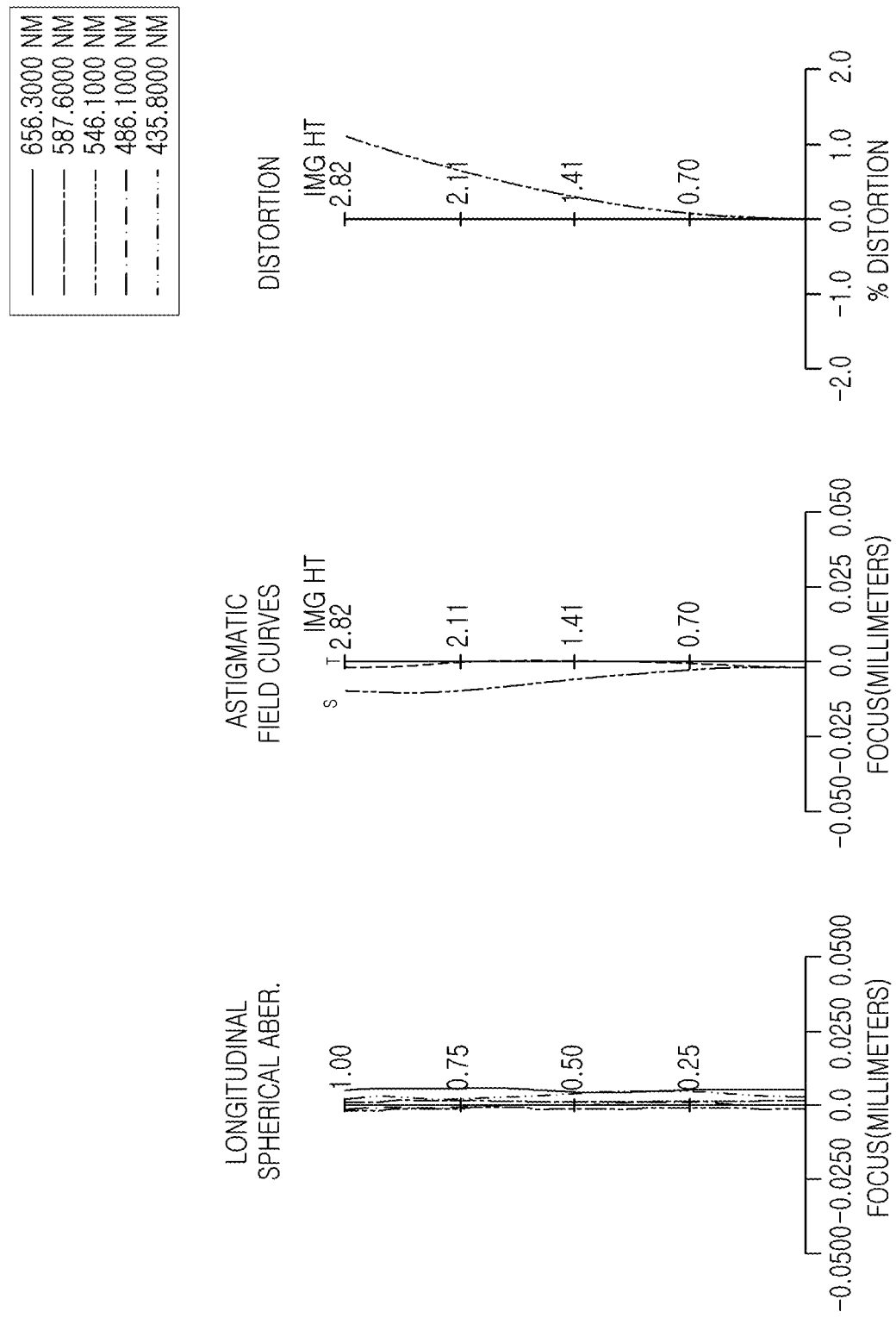
FIGS. 10 and 11 are curves illustrating aberration characteristics of the optical imaging system illustrated in FIG. 9.
Figure 11:
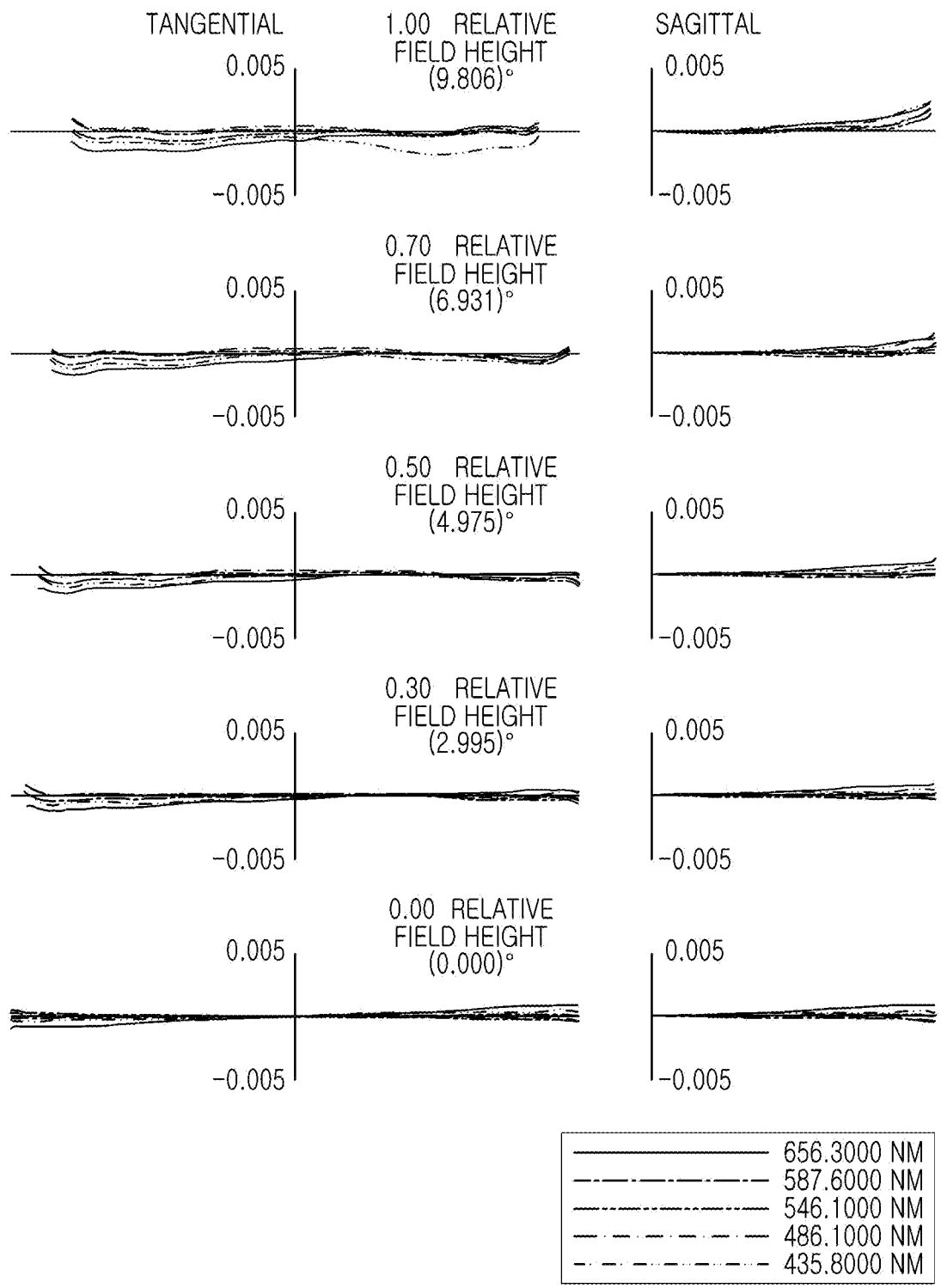

Further, the thus configured optical imaging system has aberration characteristics illustrated in FIGS. 10 and 11.

An example of the second embodiment of the optical imaging system 3 will be described with reference to FIGS. 12 to 14.

The second embodiment of the optical imaging system 3 includes a first lens 210, a second lens 220, a third lens 230, a fourth lens 240, and a fifth lens 250.

Figure 12:
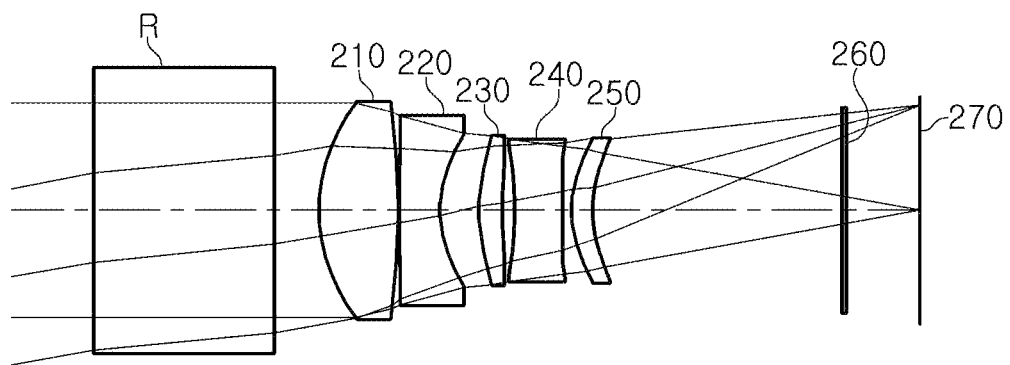
FIG. 12 is a configuration diagram of a second embodiment of an optical imaging system.

In FIG. 12, reference numeral 260 denotes an infrared light blocking filter, and reference numeral 270 denotes an image sensor.

Characteristics of a lens (a radius of curvature of a lens, a thickness of a lens, distance between lenses, a refractive index, an Abbe number, an effective aperture radius, and the like) are illustrated in Table 9.

The total focal length of the optical imaging system 3 is 15 mm.

The second lens 220 has negative refractive power, a first surface of the second lens 220 is convex in the paraxial region, and a second surface of the second lens 220 is concave in the paraxial region.

The third lens 230 has positive refractive power, and a first surface of the third lens 230 is convex in the paraxial region, and a second surface of the third lens 230 is concave in the paraxial region.

The fourth lens 240 has negative refractive power, a first surface of the fourth lens 240 is concave in the paraxial region, and a second surface is convex in the paraxial region.

The fifth lens 250 has positive refractive power, a first surface of the fifth lens 250 is convex in the paraxial region, and a second surface is concave in the paraxial region. In addition, in a region except for the paraxial region, the first

TABLE 9

| Surface No. |  | Radius of Curvature | Thickness or Distance | Refractive Index | Abbe No. | Effective Aperture Radius | Focal Length |
|---|---|---|---|---|---|---|---|
|  | Prism | Infinity | 4.500 | 1.7174 | 29.50 |  |  |
|  | Prism | Infinity | 1.100 |  |  |  |  |
| S1 | 1st Lens | 4.2592383 | 2.000 | 1.5315 | 55.66 | 2.700 | 6.111269 |
| S2 |  | −11.91603 | 0.030 |  |  | 2.473 |  |
| S3 | 2nd Lens | 15.742026 | 1.000 | 1.6150 | 25.96 | 2.360 | −4.867794 |
| S4 |  | 2.4729048 | 0.970 |  |  | 1.927 |  |
| S5 | 3rd Lens | 4.1575729 | 0.580 | 1.6707 | 19.24 | 1.866 | 11.456635 |
| S6 |  | 8.4283765 | 0.315 |  |  | 1.817 |  |
| S7 | 4th Lens | −6.398984 | 1.200 | 1.6150 | 25.96 | 1.778 | −14.64771 |
| S8 |  | −23.1652 | 0.205 |  |  | 1.747 |  |
| S9 | 5th Lens | 2.3606603 | 0.540 | 1.5441 | 56.11 | 1.800 | 20.653109 |
| S10 |  | 2.7436757 | 6.180 |  |  | 1.772 |  |
| S11 | Filter | Infinity | 0.110 | 1.5167 | 64.17 |  |  |
| S12 |  | Infinity | 1.847 |  |  |  |  |
| S13 | Imaging Plane | Infinity | 0.003 |  |  |  |  |

In the second embodiment of the optical imaging system 3, the first lens 210 has positive refractive power, and a first surface and a second surface of the first lens 210 are convex in the paraxial region.

A focal length of the first lens 210 is shorter than half of the total focal length, and larger than the absolute value of the focal length of the second lens 220.

surface of the fifth lens 250 is convex, and the second surface is concave.

Surfaces of the first lens 210 to the fifth lens 250 have a non-spherical surface coefficient as illustrated in Table 10, respectively. For example, the object-side surface and the image-side surface of the first lens 210 to the fifth lens 250 are all non-spherical surfaces.

TABLE 10

|   | S1 | S2 | S3 | S4 | S5 |
|---|---|---|---|---|---|
| K | −0.65874613 | 0.00000000 | 0.00000000 | 0.00000000 | 0.00000000 |
| A | 0.00102323 | 0.00390175 | −0.01045728 | −0.02483569 | −0.01455378 |
| B | 0.00005302 | −0.00021123 | 0.00140151 | 0.00063187 | 0.00004749 |
| C | −0.00000137 | −0.00001679 | −0.00008255 | 0.00010758 | 0.00014122 |
| D | 0.00000015 | 0.00000123 | −0.00000207 | 0.00000952 | 0.00010355 |
| E | −0.00000008 | 0.00000006 | 0.00000049 | −0.00001105 | −0.00002268 |

|   | S6 | S7 | S8 | S9 | S10 |
|---|---|---|---|---|---|
| K | 0.00000000 | 0.00000000 | 0.00000000 | 0.00000000 | 0.00000000 |
| A | −0.02362937 | 0.01763492 | 0.01700066 | −0.03479587 | −0.03057826 |
| B | 0.00402142 | −0.00381016 | −0.00292915 | 0.00033390 | 0.00220673 |
| C | −0.00041442 | 0.00087620 | 0.00069200 | 0.00089343 | 0.00021229 |
| D | 0.00005352 | −0.00018259 | −0.00004733 | −0.00013588 | −0.00002850 |
| E | −0.00001235 | 0.00001242 | −0.00000513 | −0.00000496 | −0.00000284 |

Figure 13:
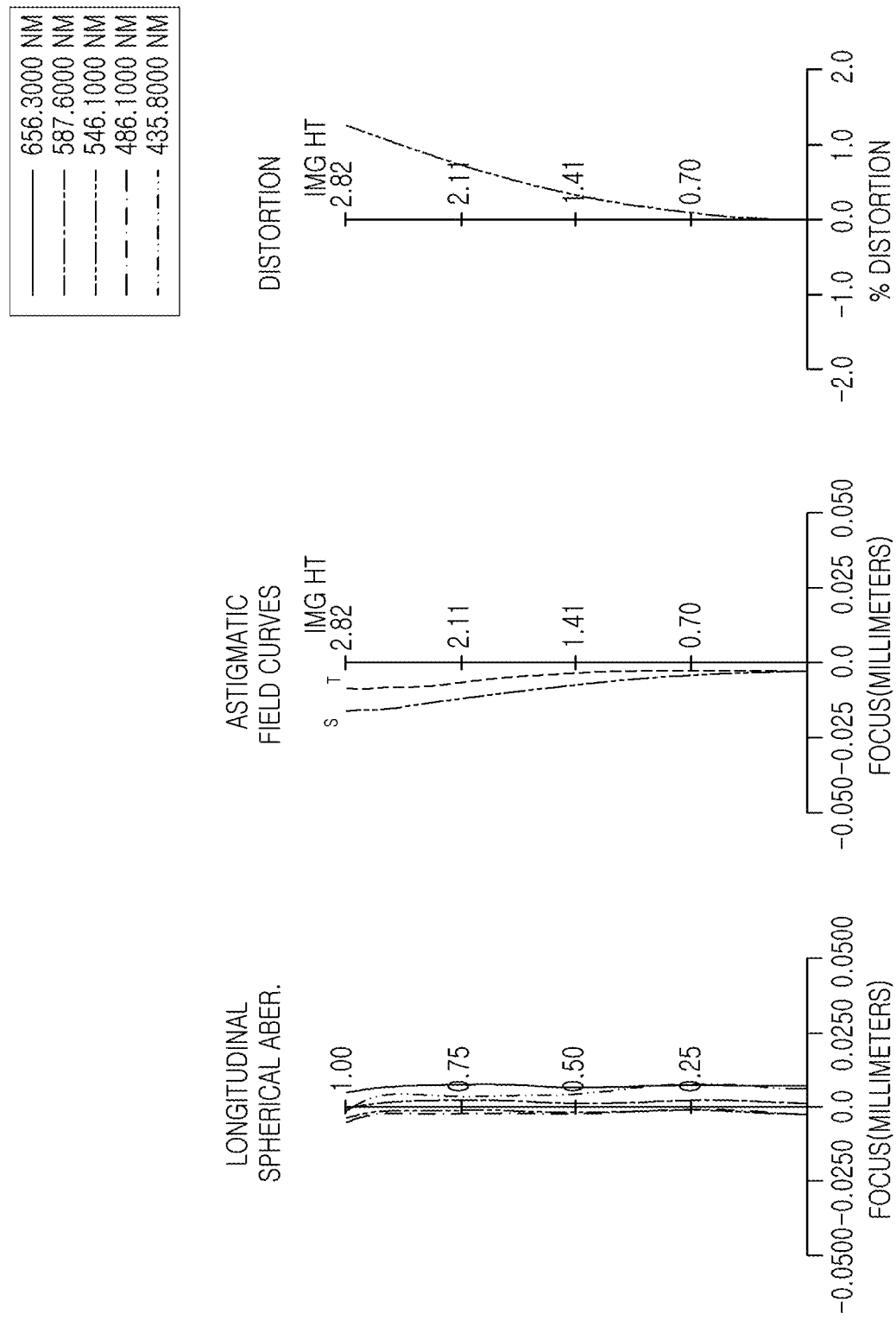
FIGS. 13 and 14 are curves illustrating aberration characteristics of the optical imaging system illustrated in FIG. 12.
Figure 14:
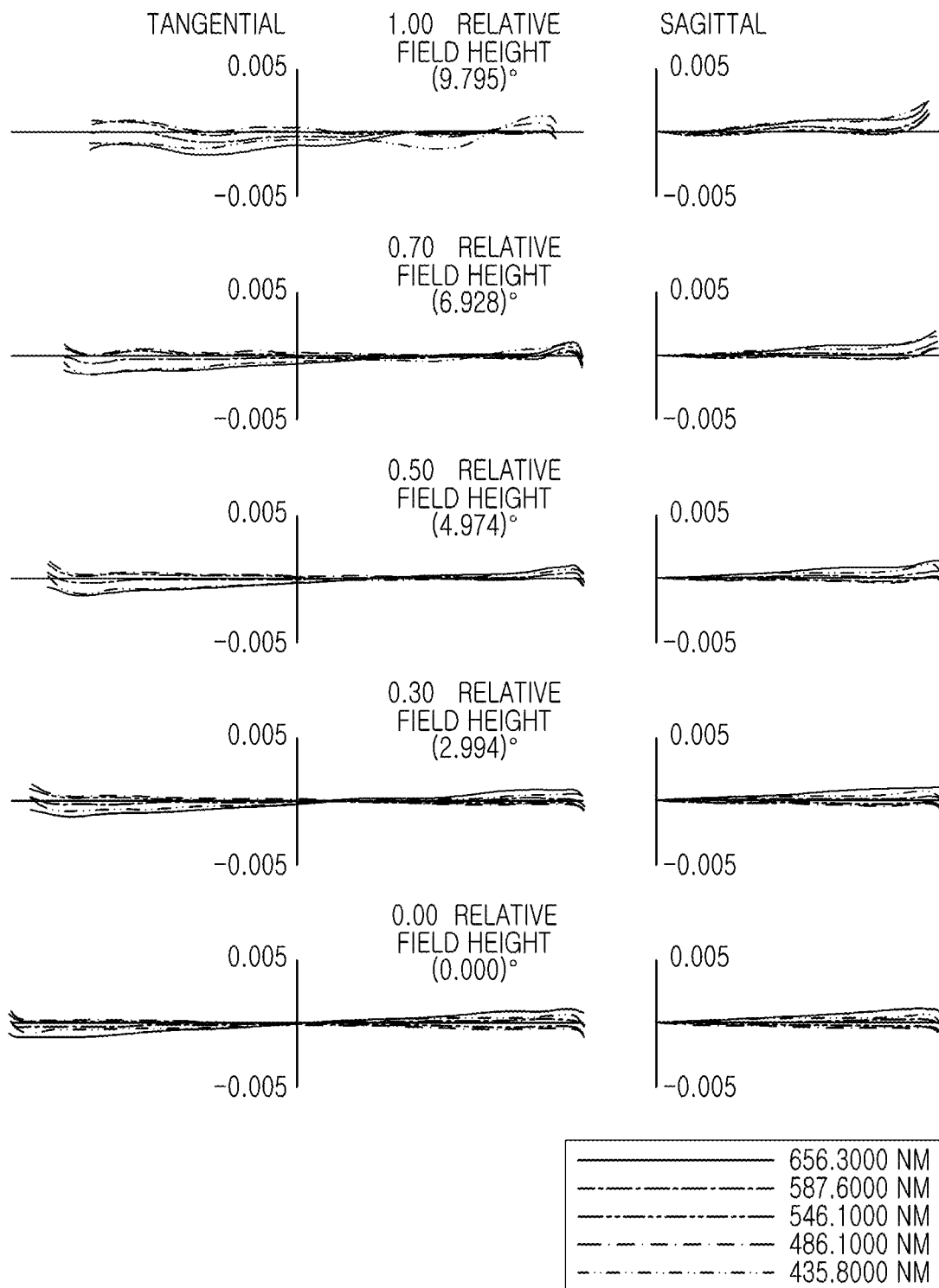

Further, the thus configured optical imaging system has aberration characteristics illustrated in FIGS. 13 and 14.

An example of the third embodiment of the optical imaging system 3 will be described with reference to FIGS. 15 to 17.

The third embodiment of the optical imaging system 3 includes a first lens 310, a second lens 320, a third lens 330, a fourth lens 340, and a fifth lens 350.

Figure 15:
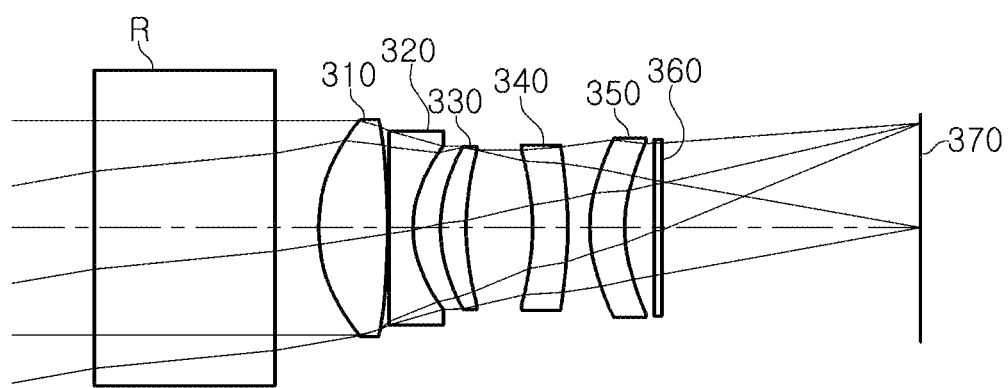
FIG. 15 is a configuration diagram of a third embodiment of an optical imaging system.

In FIG. 15, reference numeral 360 denotes an infrared light blocking filter, and reference numeral 370 denotes an image sensor.

Characteristics of a lens (a radius of curvature of a lens, a thickness of a lens, distance between lenses, a refractive index, an Abbe number, an effective aperture radius, and the like) are illustrated in Table 11.

The total focal length of the optical imaging system 3 is 15 mm.

The second lens 320 has negative refractive power, a first surface of the second lens 320 is convex in the paraxial region, and a second surface of the second lens 320 is concave in the paraxial region.

The third lens 330 has positive refractive power, a first surface of the third lens 330 is convex in the paraxial region, and a second surface of the third lens 330 is concave in the paraxial region.

The fourth lens 340 has negative refractive power, a first surface of the fourth lens 340 is concave in the paraxial region, and a second surface is convex in the paraxial region.

The fifth lens 350 has positive refractive power, a first surface of the fifth lens 350 is convex in the paraxial region, and a second surface is concave in the paraxial region. In addition, in a region except for the paraxial region, the first

TABLE 11

| Surface No. |  | Radius of Curvature | Thickness or Distance | Refractive Index | Abbe No. | Effective Aperture Radius | Focal Length |
|---|---|---|---|---|---|---|---|
|  | Prism | Infinity | 4.500 | 1.7174 | 29.50 |  |  |
|  | Prism | Infinity | 1.100 |  |  |  |  |
| S1 | 1st Lens | 3.8338273 | 1.713 | 1.5315 | 55.66 | 2.700 | 5.652708 |
| S2 |  | −12.25887 | 0.030 |  |  | 2.564 |  |
| S3 | 2nd Lens | 44.04519 | 0.600 | 1.6150 | 25.96 | 2.437 | −4.504441 |
| S4 |  | 2.6149102 | 0.692 |  |  | 2.043 |  |
| S5 | 3rd Lens | 3.6156811 | 0.635 | 1.6707 | 19.24 | 2.030 | 11.731138 |
| S6 |  | 6.1517404 | 1.651 |  |  | 1.943 |  |
| S7 | 4th Lens | −4.724285 | 0.873 | 1.6150 | 25.96 | 1.954 | −25.41663 |
| S8 |  | −7.221338 | 0.551 |  |  | 2.060 |  |
| S9 | 5th Lens | 3.1264726 | 0.878 | 1.5441 | 56.11 | 2.244 | 32.665226 |
| S10 |  | 3.4142292 | 0.721 |  |  | 2.164 |  |
| S11 | Filter | Infinity | 0.210 | 1.5167 | 64.17 |  |  |
| S12 |  | Infinity | 6.425 |  |  |  |  |
| S13 | Imaging Plane | Infinity | 0.001 |  |  |  |  |

In the third embodiment of the optical imaging system 3, the first lens 310 has positive refractive power, and a first surface and a second surface of the first lens 310 are convex in the paraxial region.

A focal length of the first lens 310 is shorter than half of the total focal length, and larger than the absolute value of the focal length of the second lens 320.

surface of the fifth lens 350 is convex, and the second surface is concave.

Surfaces of the first lens 310 to the fifth lens 350 have a non-spherical surface coefficient as illustrated in Table 12, respectively. For example, the object-side surface and the image-side surface of the first lens 310 to the fifth lens 350 are all non-spherical surfaces.

TABLE 12

|   | S1 | S2 | S3 | S4 | S5 |
|---|---|---|---|---|---|
| K | −0.84802901 | 0.00000000 | 0.00000000 | 0.00000000 | 0.00000000 |
| A | 0.00049155 | 0.00409512 | −0.00254990 | −0.01303451 | −0.00959157 |
| B | 0.00013502 | −0.00032480 | 0.00038632 | 0.00104549 | 0.00285694 |
| C | −0.00001219 | −0.00002339 | −0.00007401 | −0.00041592 | −0.00082408 |
| D | 0.00000153 | 0.00000366 | 0.00000378 | 0.00008901 | 0.00012491 |
| E | −0.00000016 | −0.00000010 | 0.00000012 | −0.00001150 | −0.00000528 |

|   | S6 | S7 | S8 | S9 | S10 |
|---|---|---|---|---|---|
| K | 0.00000000 | 0.00000000 | 0.00000000 | 0.00000000 | 0.00000000 |
| A | −0.00855112 | 0.01921739 | 0.00939560 | −0.02096455 | −0.01743055 |
| B | 0.00352595 | −0.00319561 | −0.00055655 | 0.00124163 | 0.00083493 |
| C | −0.00115747 | 0.00023017 | 0.00004516 | 0.00028090 | 0.00032807 |
| D | 0.00017027 | −0.00000425 | 0.00000762 | −0.00005890 | −0.00006638 |
| E | −0.00000622 | −0.00000140 | −0.00000201 | 0.00000271 | 0.00000382 |

Figure 16:
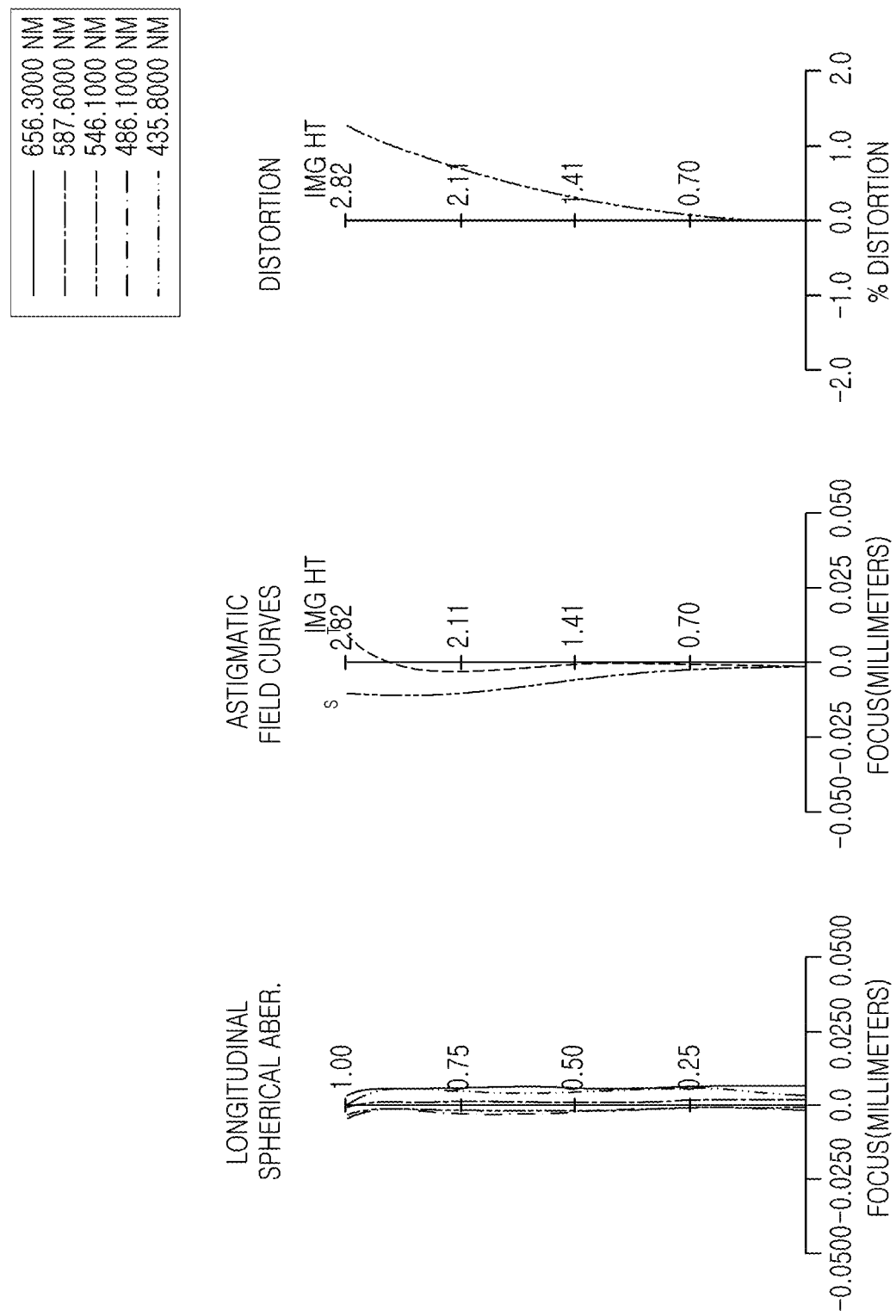
FIGS. 16 and 17 are curves illustrating aberration characteristics of the optical imaging system illustrated in FIG. 15.
Figure 17:
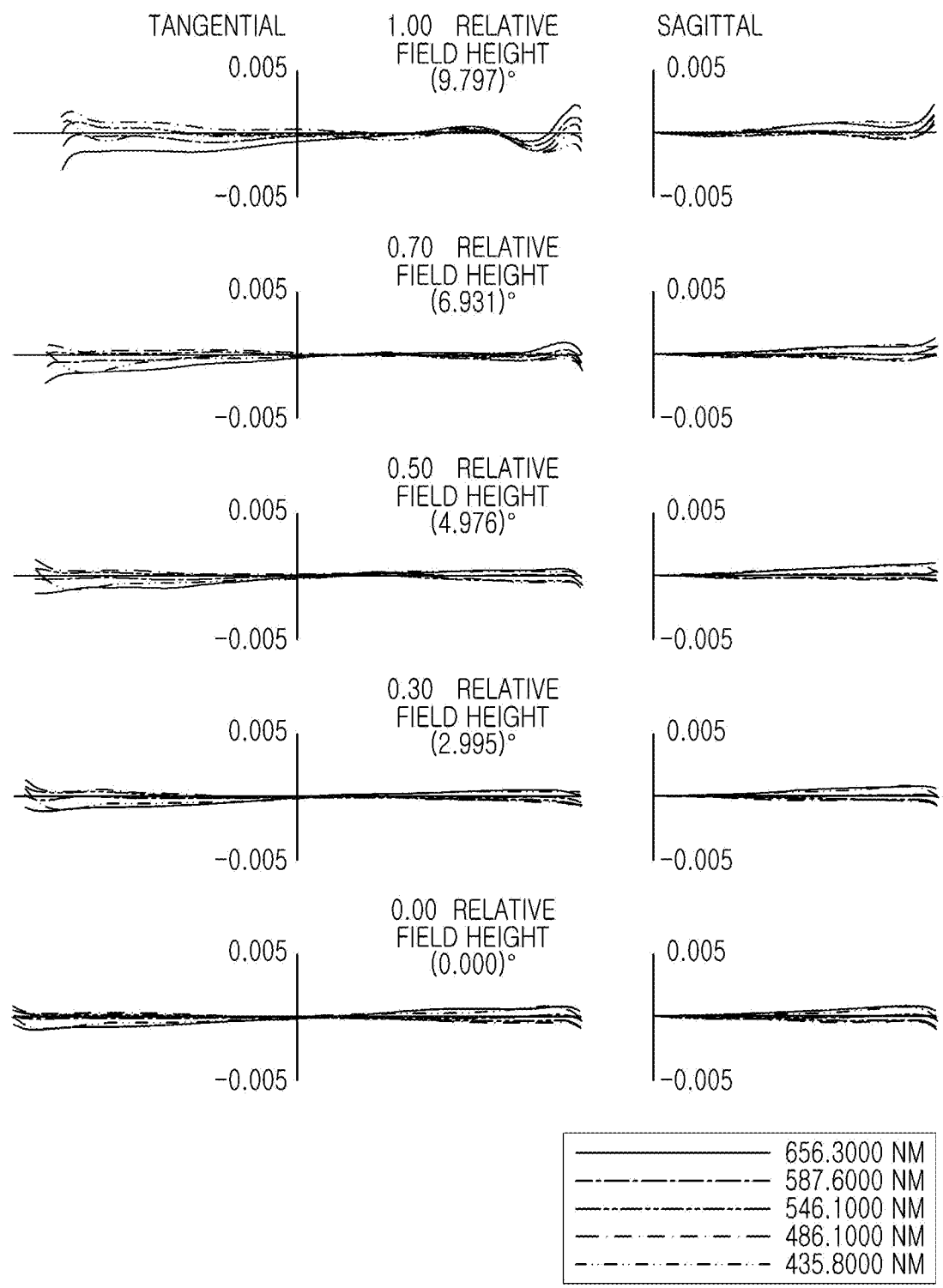

Further, the thus configured optical imaging system has aberration characteristics illustrated in FIGS. 16 and 17.

An example of the fourth embodiment of the optical imaging system 3 will be described with reference to FIGS. 18 to 20.

The fourth embodiment of the optical imaging system 3 includes a first lens 410, a second lens 420, a third lens 430, a fourth lens 440, and a fifth lens 450.

Figure 18:
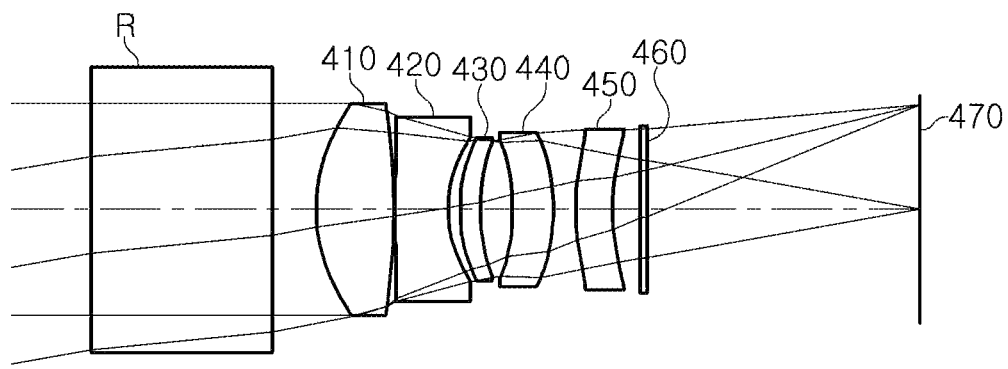
FIG. 18 is a configuration diagram of a fourth embodiment of an optical imaging system.

In FIG. 18, reference numeral 460 denotes an infrared light blocking filter, and reference numeral 470 denotes an image sensor.

Characteristics of a lens (a radius of curvature of a lens, a thickness of a lens, distance between lenses, a refractive index, an Abbe number, an effective aperture radius, and the like) are illustrated in Table 13.

The total focal length of the optical imaging system 3 is 15 mm.

The second lens 420 has negative refractive power, a first surface of the second lens 420 is convex in the paraxial region, and a second surface of the second lens 420 is concave in the paraxial region.

The third lens 430 has positive refractive power, a first surface of the third lens 430 is convex in the paraxial region, and a second surface of the third lens 430 is concave in the paraxial region.

The fourth lens 440 has positive refractive power, a first surface of the fourth lens 440 is concave in the paraxial region, and a second surface is convex in the paraxial region.

The fifth lens 450 has positive refractive power, a first surface of the fifth lens 450 is convex in the paraxial region, and a second surface is concave in the paraxial region. In addition, in a region except for the paraxial region, the first

TABLE 13

| Surface No. |   | Radius of Curvature | Thickness or Distance | Refractive Index | Abbe No. | Effective Aperture Radius | Focal Length |
|---|---|---|---|---|---|---|---|
|   | Prism | Infinity | 4.5 | 1.7174 | 29.50 |   |   |
|   | Prism | Infinity | 1.1 |   |   |   |   |
| S1 | 1st Lens | 4.3275887 | 1.919995918 | 1.5315 | 55.66 | 2.650 | 6.417136 |
| S2 |   | −14.24283 | 0.03 |   |   | 2.438 |   |
| S3 | 2nd Lens | 24.003293 | 1.324753314 | 1.6150 | 25.96 | 2.323 | −5.345015 |
| S4 |   | 2.8504255 | 0.304478551 |   |   | 1.806 |   |
| S5 | 3rd Lens | 4.1762363 | 0.518489229 | 1.6510 | 21.50 | 1.794 | 20.16047 |
| S6 |   | 5.7942522 | 0.780509145 |   |   | 1.703 |   |
| S7 | 4th Lens | −4.278197 | 1.014658069 | 1.6150 | 25.96 | 1.732 | 355.86708 |
| S8 |   | −4.577765 | 0.54918409 |   |   | 1.929 |   |
| S9 | 5th Lens | 4.5763314 | 0.920607 | 1.5441 | 56.11 | 2.015 | 122.96738 |
| S10 |   | 4.5618452 | 0.705268963 |   |   | 2.021 |   |
| S11 | Filter | Infinity | 0.153103832 | 1.5167 | 64.17 |   |   |
| S12 |   | Infinity | 6.776811177 |   |   |   |   |
| S13 | Imaging Plane | Infinity | 0.002141648 |   |   |   |   |

In the fourth embodiment of the optical imaging system 3, the first lens 410 has positive refractive power, and a first surface and a second surface of the first lens 410 are convex in the paraxial region.

A focal length of the first lens 410 is shorter than half of the total focal length, and larger than the absolute value of the focal length of the second lens 420.

surface of the fifth lens 450 is convex, and the second surface is concave.

Surfaces of the first lens 410 to the fifth lens 450 have a non-spherical surface coefficient as illustrated in Table 14, respectively. For example, the object-side surface and the image-side surface of the first lens 410 to the fifth lens 450 are all non-spherical surfaces.

TABLE 14

|   | S1 | S2 | S3 | S4 | S5 |
|---|---|---|---|---|---|
| K | -0.70137171 | 0.00000000 | 0.00000000 | 0.00000000 | 0.00000000 |
| A | 0.00099425 | 0.00144742 | -0.00361412 | -0.00576326 | -0.00061021 |
| B | 0.00000991 | 0.00000111 | 0.00026288 | 0.00010513 | 0.00252501 |
| C | 0.00000807 | -0.00001645 | -0.00002419 | -0.00025228 | -0.00098208 |
| D | -0.00000086 | 0.00000161 | 0.00000362 | 0.00001546 | 0.00009614 |
| E | 0.00000001 | -0.00000003 | -0.00000013 | 0.00000319 | 0.00000325 |

|   | S6 | S7 | S8 | S9 | S10 |
|---|---|---|---|---|---|
| K | 0.00000000 | 0.00000000 | -1.98086445 | 0.00000000 | 0.00000000 |
| A | -0.00141257 | 0.01071713 | 0.00047843 | -0.01467572 | -0.01218616 |
| B | 0.00435104 | -0.00012423 | -0.00033396 | 0.00025391 | 0.00023194 |
| C | -0.00153789 | -0.00075069 | -0.00024668 | -0.00002615 | 0.00003185 |
| D | 0.00021735 | 0.00017268 | 0.00006244 | 0.00001984 | 0.00000099 |
| E | -0.00000601 | -0.00001289 | -0.00000472 | -0.00000115 | 0.00000003 |

Figure 19:
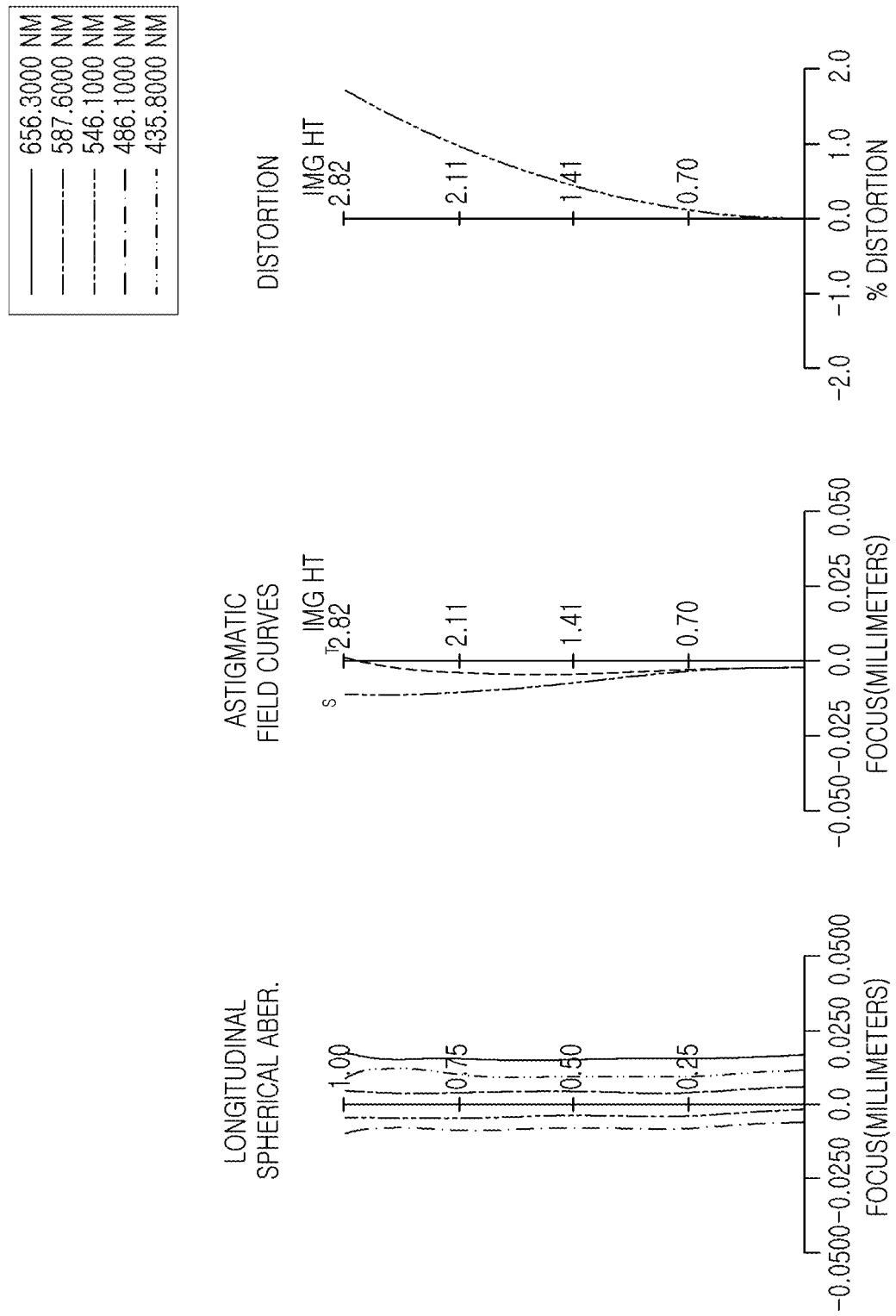
FIGS. 19 and 20 are curves illustrating aberration characteristics of the optical imaging system illustrated in FIG. 18.
Figure 20:
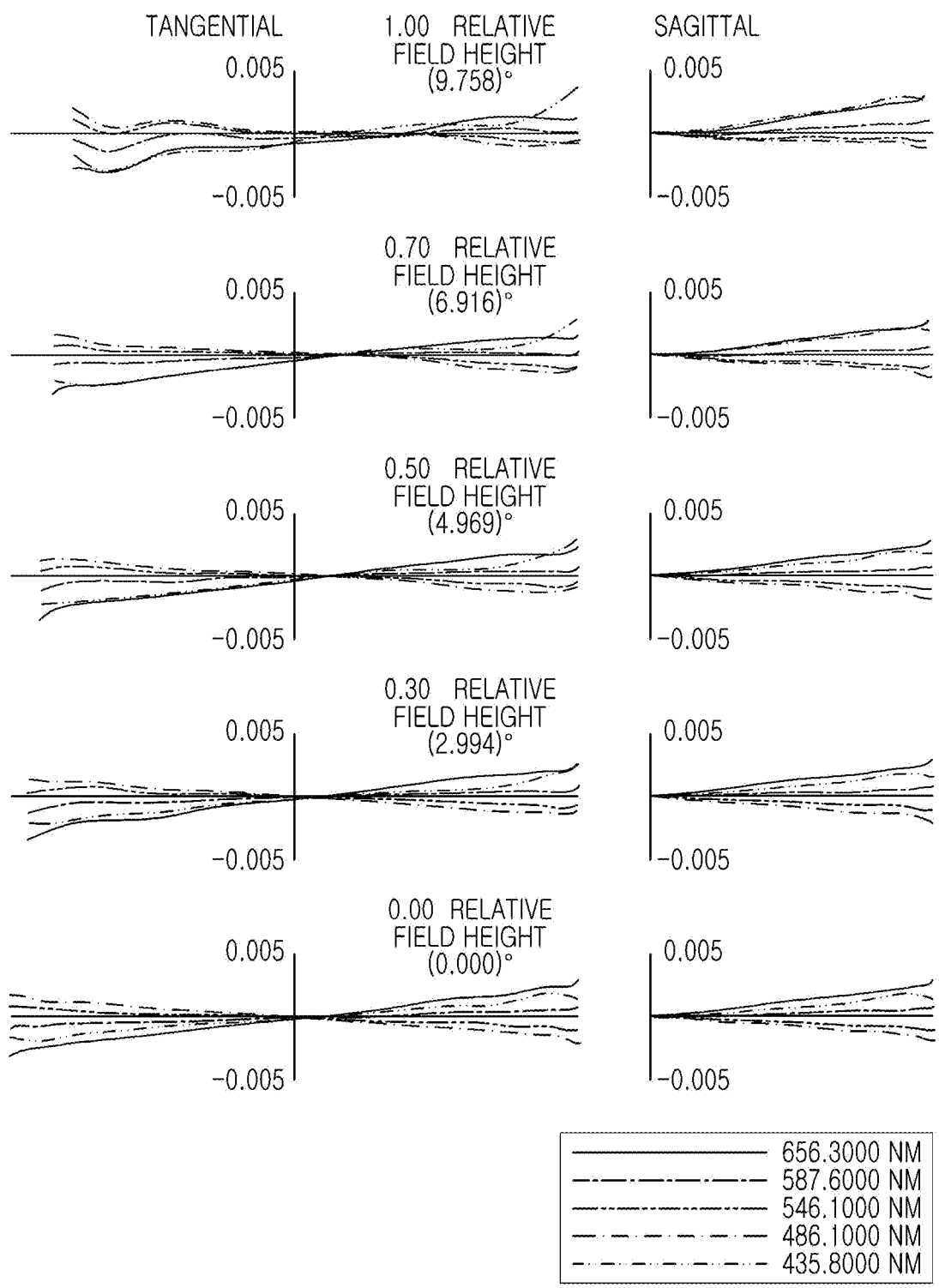

Further, the thus configured optical imaging system has aberration characteristics illustrated in FIGS. 19 and 20.

An example of the fifth embodiment of the optical imaging system 3 will be described with reference to FIGS. 21 to 23.

The fifth embodiment of the optical imaging system 3 includes a first lens 510, a second lens 520, a third lens 530, a fourth lens 540, and a fifth lens 550.

Figure 21:
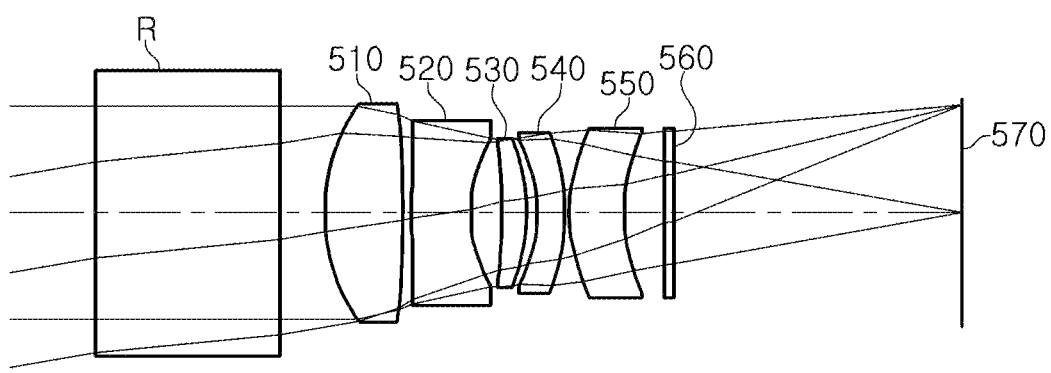
FIG. 21 is a configuration diagram of a fifth embodiment of an optical imaging system.

In FIG. 21, reference numeral 560 denotes an infrared light blocking filter, and reference numeral 570 denotes an image sensor.

Characteristics of a lens (a radius of curvature of a lens, a thickness of a lens, distance between lenses, a refractive index, an Abbe number, an effective aperture radius, and the like) are illustrated in Table 15.

The total focal length (f) of the optical imaging system 3 is 14.9712 mm.

The second lens 520 has negative refractive power, a first surface of the second lens 520 is convex in the paraxial region, and a second surface of the second lens 520 is concave in the paraxial region.

The third lens 530 has positive refractive power, a first surface of the third lens 530 is concave in the paraxial region, and a second surface of the third lens 530 is convex in the paraxial region.

The fourth lens 540 has negative refractive power, a first surface of the fourth lens 540 is concave in the paraxial region, and a second surface is convex in the paraxial region.

The fifth lens 550 has positive refractive power, a first surface of the fifth lens 550 is convex in the paraxial region, and a second surface is concave in the paraxial region. In addition, in a region except for the paraxial region, the first

TABLE 15

| Surface No. |  | Radius of Curvature | Thickness or Distance | Refractive Index | Abbe No. | Effective Aperture Radius | Focal Length |
|---|---|---|---|---|---|---|---|
|  | Prism | Infinity | 4.5 | 1.7174 | 29.50 |  |  |
|  | Prism | Infinity | 1.1 |  |  |  |  |
| S1 | 1st Lens | 4.6708423 | 1.89846332 | 1.5315 | 55.66 | 2.653 | 7.321103 |
| S2 |  | -21.20963 | 0.212169417 |  |  | 2.417 |  |
| S3 | 2nd Lens | 23.99194 | 1.447475429 | 1.6150 | 25.96 | 2.261 | -6.476088 |
| S4 |  | 3.3601753 | 0.741853806 |  |  | 1.809 |  |
| S5 | 3rd Lens | -9.931184 | 0.59547026 | 1.6392 | 23.52 | 1.807 | 13.992913 |
| S6 |  | -4.841635 | 0.261488293 |  |  | 1.802 |  |
| S7 | 4th Lens | -3.222737 | 0.671314943 | 1.6150 | 25.96 | 1.810 | -18.16407 |
| S8 |  | -4.874588 | 0.114264479 |  |  | 1.962 |  |
| S9 | 5th Lens | 3.5284184 | 1.341138278 | 1.5441 | 56.11 | 2.050 | 26.366731 |
| S10 |  | 4.0767714 | 1 |  |  | 1.972 |  |
| S11 | Filter | Infinity | 0.21 | 1.5167 | 64.17 |  |  |
| S12 |  | Infinity | 7.003334369 |  |  |  |  |
| S13 | Imaging Plane | Infinity | 0.002867186 |  |  |  |  |

In the fifth embodiment of the optical imaging system 3, the first lens 510 has positive refractive power, and a first surface and a second surface of the first lens 510 are convex in the paraxial region.

A focal length of the first lens 510 is shorter than half of the total focal length, and larger than the absolute value of the focal length of the second lens 520.

surface of the fifth lens 550 is convex, and the second surface is concave.

Surfaces of the first lens 510 to the fifth lens 550 have a non-spherical surface coefficient as illustrated in Table 16, respectively. For example, the object-side surface and the image-side surface of the first lens 510 to the fifth lens 550 are all non-spherical surfaces.

TABLE 16

|   | S1 | S2 | S3 | S4 | S5 |
|---|---|---|---|---|---|
| K | −0.59707661 | 0.00000000 | 0.00000000 | 0.00000000 | 0.00000000 |
| A | 0.00086594 | 0.00123613 | −0.00425300 | −0.00559248 | 0.00873119 |
| B | 0.00002209 | −0.00013526 | 0.00008918 | −0.00004613 | −0.00225383 |
| C | 0.00000182 | −0.00000604 | 0.00000097 | 0.00010802 | 0.00055094 |
| D | −0.00000048 | 0.00000108 | 0.00000134 | −0.00000954 | −0.00007255 |
| E |  |  |  |  |  |

|   | S6 | S7 | S8 | S9 | S10 |
|---|---|---|---|---|---|
| K | 0.00000000 | 0.00000000 | −2.62067569 | 0.00000000 | 0.00000000 |
| A | 0.00081187 | 0.00781721 | 0.00221061 | −0.00870129 | −0.00311062 |
| B | −0.00002159 | 0.00240840 | 0.00026360 | −0.00064519 | −0.00074027 |
| C | 0.00057616 | −0.00048394 | −0.00038910 | 0.00004601 | 0.00001898 |
| D | −0.00020034 | −0.00005351 | 0.00005629 | −0.00000207 | 0.00000729 |
| E | 0.00001563 | 0.00001289 | −0.00000200 | 0.00000077 | −0.00000007 |

Figure 22:
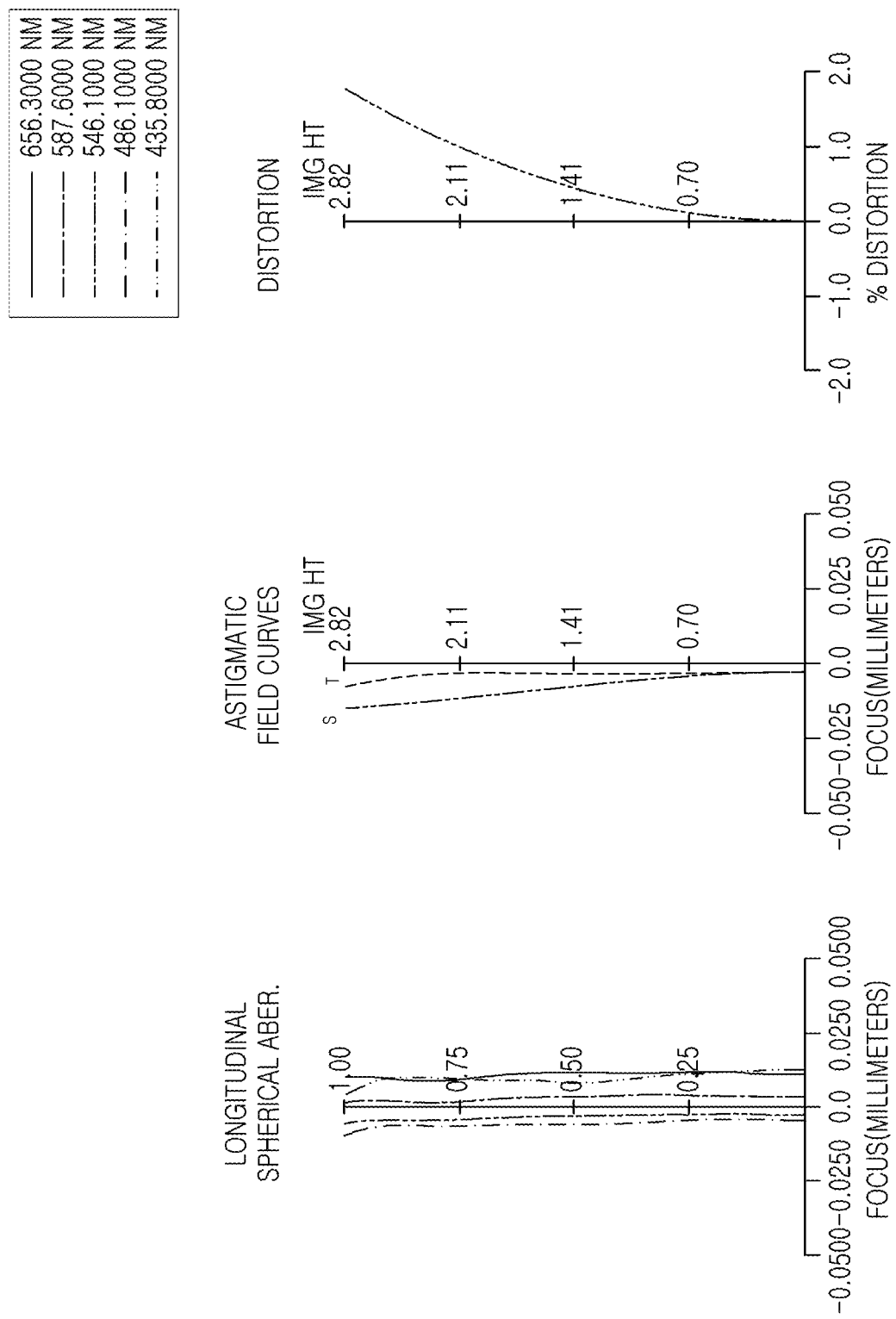
FIGS. 22 and 23 are curves illustrating aberration characteristics of the optical imaging system illustrated in FIG. 21.
Figure 23:
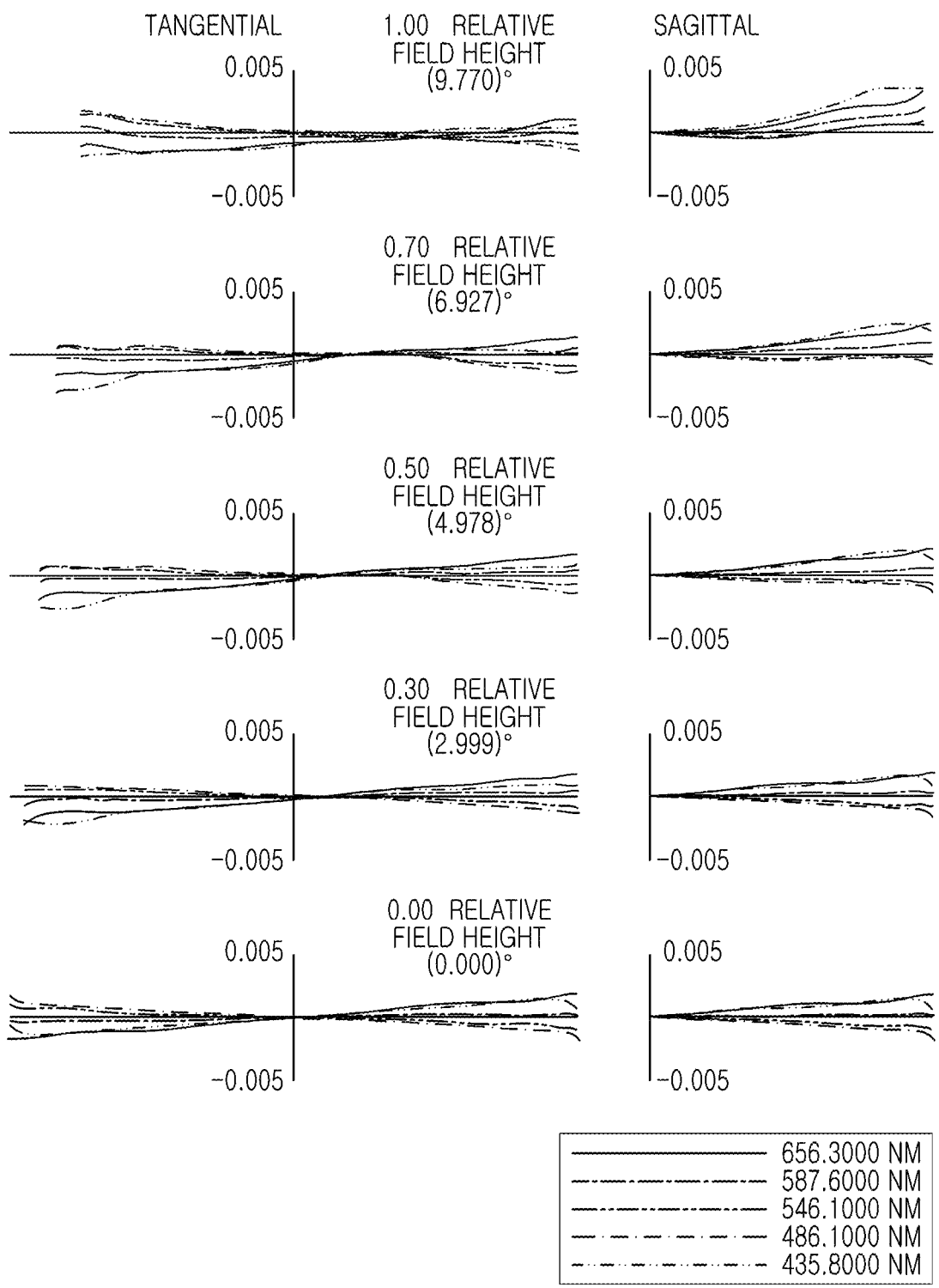

Further, the thus configured optical imaging system has aberration characteristics illustrated in FIGS. 22 and 23.

Referring to the above embodiments, a lens assembly according to an embodiment of the present disclosure may reduce a size of the lens assembly while securing performance of the lens assembly.

The optical imaging system and the lens assembly including the optical imaging system according to an embodiment of the present disclosure may reduce the size of the optical imaging system and the lens assembly and improve the performance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens;
   a second lens;
   a third lens;
   a fourth lens; and
   a fifth lens, sequentially disposed from an object side,
   wherein the first to fifth lenses are spaced apart from each other by predetermined distances along an optical axis in a paraxial region,
   wherein the first lens and the second lens each comprise a non-circular shape when viewed in an optical axis direction, and
   wherein the optical imaging system satisfies 0.62398<ZS1/ZS2<1.36318, where ZS1 is a ratio of an area of an object-side surface of the first lens to a distance on the optical axis from the object-side surface of the first lens to an imaging plane of an image sensor, and ZS2 is a ratio of an area of an object-side surface of the second lens to a distance on the optical axis from the object-side surface of the second lens to the imaging plane of the image sensor.

2. The optical imaging system according to claim 1, wherein the optical imaging system further satisfies 1.607 mm<ZS1<2.014 mm.

3. The optical imaging system according to claim 2, wherein the optical imaging system further satisfies 1.838 mm<ZS2<2.303 mm.

4. The optical imaging system according to claim 3,
   wherein the first lens comprises a first side surface and a second side surface, each comprising an arc shape when viewed in the optical axis direction, and a third side surface and a fourth side surface connecting the first side surface and the second side surface, and
   wherein the optical imaging system further satisfies 73.9 degrees<α<106.4 degrees, where α is an angle between a first imaginary line connecting the optical axis and a connection point between the first side surface and the fourth side surface and a second imaginary line connecting the optical axis and a connection point between the second side surface and the fourth side surface.

5. The optical imaging system according to claim 4, wherein the optical imaging system further satisfies 0.599<AR<0.799, where a line segment connecting the third side surface and the fourth side surface through the optical axis in a shortest distance represents a minor axis, a line segment connecting the first side surface and the second side surface through the optical axis and perpendicular to the minor axis represents a major axis, and AR is a ratio of a length of the minor axis to a length of the major axis.

6. The optical imaging system according to claim 1,
   wherein the third to fifth lenses each comprise a non-circular shape when viewed in the optical axis direction,
   wherein the first lens comprises a first side surface and a second side surface, each comprising an arc shape when viewed in the optical axis direction, and a third side surface and a fourth side surface connecting the first side surface and the second side surface, and
   wherein the optical imaging system further satisfies 92.4 degrees<α<121.0 degrees, where α is an angle between a first imaginary line connecting the optical axis and a connection point between the first side surface and the fourth side surface and a second imaginary line connecting the optical axis and a connection point between the second side surface and the fourth side surface.

7. The optical imaging system according to claim 6, wherein the optical imaging system further satisfies 1.351 mm<ZS1<1.811 mm and 1.545 mm<ZS2<2.07 mm.

8. The optical imaging system according to claim 1, further comprising a sixth lens and a seventh lens,
   wherein the third to seventh lenses each comprise a non-circular shape when viewed in the optical axis direction,
   wherein the first lens comprises a first side surface and a second side surface, each comprising an arc shape when viewed in the optical axis direction, and a third side surface and a fourth side surface connecting the first side surface and the second side surface, and
   wherein the optical imaging system further satisfies 79.4 degrees<α<126.4 degrees, where α is an angle between a first imaginary line connecting the optical axis and a connection point between the first side surface and the fourth side surface and a second imaginary line connecting the optical axis and a connection point between the second side surface and the fourth side surface.

9. The optical imaging system according to claim 8, wherein the optical imaging system further satisfies 1.106 mm<ZS1<1.828 mm and 1.194 mm<ZS2<1.975 mm.

10. The optical imaging system according to claim 1,
    wherein the third lens comprises a non-circular shape when viewed in the optical axis direction,
    wherein the first lens comprises a first side surface and a second side surface, each comprising an arc shape when viewed in the optical axis direction, and a third side surface and a fourth side surface connecting the first side surface and the second side surface, and
    wherein the optical imaging system further satisfies 86.2 degrees<α<116.0 degrees, where α is an angle between a first imaginary line connecting the optical axis and a connection point between the first side surface and the fourth side surface and a second imaginary line connecting the optical axis and a connection point between the second side surface and the fourth side surface.

11. The optical imaging system according to claim 10, wherein the optical imaging system further satisfies 1.1 mm<ZS1<1.438 mm and 1.258 mm<ZS2<1.644 mm.

12. The optical imaging system according to claim 1,
    wherein the third to fifth lenses each comprise a non-circular shape when viewed in the optical axis direction,
    wherein a length of a relative long side of the image sensor is 1.5 times or more a length of a relative short side of the image sensor,
    wherein the first lens comprises a first side surface and a second side surface, each comprising an arc shape when viewed in the optical axis direction, and a third side surface and a fourth side surface connecting the first side surface and the second side surface, and
    wherein the optical imaging system further satisfies 101.3 degrees<α<128.6 degrees, where α is an angle between a first imaginary line connecting the optical axis and a connection point between the first side surface and the fourth side surface and a second imaginary line connecting the optical axis and a connection point between the second side surface and the fourth side surface.

13. The optical imaging system according to claim 12, wherein the optical imaging system further satisfies 0.916 mm<ZS1<1.284 mm and 1.048 mm<ZS2<1.468 mm.

14. The optical imaging system according to claim 1, further comprising a sixth lens and a seventh lens,
    wherein the third to seventh lenses each comprise a non-circular shape when viewed in the optical axis direction,
    wherein a length of a relative long side of the image sensor is 1.5 times or more a length of a relative short side of the image sensor,
    wherein the first lens comprises a first side surface and a second side surface, each comprising an arc shape when viewed in the optical axis direction, and a third side surface and a fourth side surface connecting the first side surface and the second side surface, and
    wherein the optical imaging system further satisfies 109.2 degrees<α<135.4 degrees, where α is an angle between a first imaginary line connecting the optical axis and a connection point between the first side surface and the fourth side surface and a second imaginary line connecting the optical axis and a connection point between the second side surface and the fourth side surface.

15. The optical imaging system according to claim 14, wherein the optical imaging system further satisfies 0.920 mm<ZS1<1.355 mm and 0.994 mm<ZS2<1.464 mm.

16. The optical imaging system according to claim 1, wherein the optical imaging system is a portable electronic device, further comprising a display, wherein the image sensor is configured to convert light incident through the first through fifth lenses to an electric signal and the display is configured to display an image based on the electric signal.

17. A lens assembly, comprising:
    a first lens;
    a second lens;
    a third lens;
    a fourth lens;
    a fifth lens; and
    an image sensor, sequentially disposed from an object side,
    wherein the first to fifth lenses are spaced apart from each other by predetermined distances along an optical axis in a paraxial region,
    wherein the first lens and the second lens each comprise a non-circular shape when viewed in an optical axis direction,
    wherein the first lens and the second lens each comprise an optical portion for refracting light and a flange portion extending along a periphery of at least a portion of the optical portion, and
    wherein the optical imaging system satisfies 0.73598<ZS'1/ZS'2<1.37987, where ZS'1 is a ratio of an area of the optical portion on an object-side surface of the first lens to a distance on the optical axis from the object-side surface of the first lens to an imaging plane of the image sensor, and ZS'2 is a ratio of an area of the optical portion on an object-side surface of the second lens to a distance on the optical axis from the object-side surface of the second lens to the imaging plane of the image sensor.

18. The optical imaging system according to claim 17, wherein the optical imaging system is a portable electronic device, further comprising a display, wherein the image sensor is configured to convert light incident through the first through fifth lenses to an electric signal and the display is configured to display an image based on the electric signal.

19. A portable electronic device comprising:
    a first lens, a second lens, a third lens, a fourth lens, a fifth lens, and an image sensor configured to convert light incident through the first through fifth lenses to an electric signal, sequentially disposed along an optical axis from an object side;

a reflection member disposed in front of the first to fifth lenses and configured to change a traveling direction of light from a thickness direction of the portable electronic device to an optical axis direction; and a display unit configured to display an image based on the electric signal, wherein the first lens and the second lens each comprise a non-circular shape when viewed in the optical axis direction, wherein the first lens and the second lens each comprise an optical portion for refracting light and a flange portion extending along a periphery of a portion of the optical portion, wherein the flange portion is disposed on opposite sides of the optical portion spaced apart in a direction perpendicular to the optical axis direction, and wherein the flange portion is disposed on opposite sides of the optical portion spaced apart in a direction perpendicular to the thickness direction of the portable electronic device.

20. The portable electronic device according to claim 19, wherein the optical imaging system satisfies $0.62398 < ZS1/ZS2 < 1.36318$, where ZS1 is a ratio of an area of an object-side surface of the first lens to a distance on the optical axis from the object-side surface of the first lens to an imaging plane of the image sensor, ZS2 is a ratio of an area of an object-side surface of the second lens to a distance on the optical axis from the object-side surface of the second lens to the imaging plane of the image sensor.

* * * * *